(12) United States Patent
Hafeez et al.

(10) Patent No.: US 12,245,048 B2
(45) Date of Patent: Mar. 4, 2025

(54) SPECTRUM USAGE PROTECTION IN A SHARED WIRELESS NETWORK

(71) Applicant: Charter Communications Operating, LLC, St. Louis, MO (US)

(72) Inventors: Abdulrauf Hafeez, Cary, NC (US); Maulik V. Vaidya, Escondido, CA (US)

(73) Assignee: Charter Communications Operating, LLC, St. Louis, MO (US)

(*) Notice: Subject to any disclaimer, the term of this patent is extended or adjusted under 35 U.S.C. 154(b) by 0 days.

(21) Appl. No.: 18/209,114

(22) Filed: Jun. 13, 2023

(65) Prior Publication Data

US 2023/0328534 A1 Oct. 12, 2023

Related U.S. Application Data

(63) Continuation of application No. 17/491,468, filed on Sep. 30, 2021, now Pat. No. 11,722,908.

(51) Int. Cl.
| | |
|---|---|
| *H04W 16/14* | (2009.01) |
| *H04W 48/02* | (2009.01) |
| *H04W 52/24* | (2009.01) |
| *H04W 72/56* | (2023.01) |
| *H04W 84/04* | (2009.01) |

(52) U.S. Cl.
CPC .......... *H04W 16/14* (2013.01); *H04W 48/02* (2013.01); *H04W 52/243* (2013.01); *H04W 72/56* (2023.01); *H04W 84/042* (2013.01)

(58) Field of Classification Search
CPC ... H04W 16/14; H04W 48/02; H04W 52/243; H04W 72/10; H04W 84/042
USPC ............... 370/329, 328, 338, 341, 345, 350
See application file for complete search history.

(56) References Cited

U.S. PATENT DOCUMENTS

| | | | |
|---|---|---|---|
| 11,722,908 B2* | 8/2023 | Hafeez ................. | H04W 16/14 370/329 |
| 2005/0048978 A1* | 3/2005 | Santhoff .............. | H04W 36/18 455/442 |
| 2008/0002626 A1* | 1/2008 | Yokoyama .......... | H04W 52/346 370/331 |

\* cited by examiner

*Primary Examiner* — Nghi H Ly
(74) *Attorney, Agent, or Firm* — Armis IP Law, LLC

(57) ABSTRACT

A wireless system is shared amongst a hierarchal tier of entities. A communication management resource receives notification that a second-tier priority entity has been allocated use of a second wireless spectrum as a replacement to first wireless spectrum. In one embodiment, the first wireless spectrum is revoked from the second-tier priority entity based on use of the first wireless spectrum by a first-tier priority entity (such as incumbent entity). The communication management resource controls a wireless transmit power level of a third-tier priority entity in the hierarchy to provide protected use of the second wireless spectrum by the second-tier priority entity. According to one configuration, the communication management resource controls a power level of wireless communications transmitted by a wireless base station operated by the third-tier priority entity.

29 Claims, 12 Drawing Sheets

SPECTRUM USAGE PROTECTION IN A SHARED WIRELESS NETWORK

RELATED APPLICATION

This application is a continuation application of earlier filed U.S. patent application Ser. No. 17/491,468 entitled "SPECTRUM USAGE PROTECTION IN A SHARED WIRELESS NETWORK,", filed on Sep. 30, 2021, the entire teachings of which are incorporated herein by this reference.

BACKGROUND

Conventional wireless networks typically include one or more wireless base stations to provide mobile communication devices access to a remote network such as the Internet.

One type of wireless base station is a so-called CBSD (Citizen Broadband Radio Service Device). Such a device uses a wireless channel allocated from a CBRS (Citizens Band Radio Service) band to support communications with one or more mobile communication devices.

Typically, so-called SAS (Spectrum Access System) in a CBRS network allocates one or more wireless channels to a CBSD (such as a wireless base station) to support communications with respective user equipment such as one or more mobile communication devices. Each base station can be configured to communicate with the SAS to receive notification of the one or more wireless channels allocated for its use. Controlled allocation of wireless channels by the spectrum access system helps to prevent interference by wireless stations sharing use of the same spectrum.

There are multiple different types of wireless channels in a conventional CBRS band. For example, portions of spectrum in a CBRS band include so-called Priority Access License (PAL) wireless channels, General Authorized Access (GAA) wireless channels, or a combination of both.

In general, PAL wireless channels are licensed wireless channels in which a corresponding licensee (such as an entity paying for use of the wireless channel) is provided some protection of use. For example, when no incumbent user requires use of the channels, in theory, the licenses entity is able to freely use the PAL wireless channels in respective one or more predetermined geographical regions without interference by other service providers (such as lower priority GAA service providers).

Subsequent to allocation of one or more wireless channels, the wireless base stations use the allocated spectrum to provide one or more communication devices access to a remote network such as the Internet.

In an FCC (Federal Communications Commission) Auction, several companies are awarded PAL licenses on a per county basis in the lower 10 CBRS channels. A grant of PAL licenses to an operator affords the operator protection from co-channel interference generated by lower-tier GAA service providers in the PAL Protection Area (PPA) per FCC Part 96 rules.

A PAL licensee is required to protect higher tier (incumbent entity users) at all times. In a situation where incumbent radar activity is detected (e.g., a US naval aircraft carrier approaching US shoreline) in a Dynamic Protection Area (DPA), any operating PAL licensees operating in channel(s) used by the radar, must vacate the channel(s) if and when indicated by SAS/ESC.

Based on the knowledge of all CBSD locations and granted powers in a DPA, a respective SAS computes a list of channel grants for each of the first 10 channels in the CBRS band which would have to be suspended if the DPA becomes activated. It is called a move list. Use of a wireless channel in a DPA may impact 1 or 2 PAL channels temporarily.

BRIEF DESCRIPTION OF EMBODIMENTS

There are deficiencies associated with conventional techniques of providing wireless services to mobile communication devices. For example, a SAS may facilitate PAL CBSDs on the move list to find alternate channels in the CBRS band to continue operations. However, there is no mechanism defined in the standards to protect PAL from co-channel GAA operation in the event of a move. Without protection, PAL service providers may face increased wireless interference or outages with respect to use of assigned wireless channels.

Embodiments herein provide improved use of wireless spectrum, promoting fairness amongst licensed and unlicensed wireless network service providers.

For example, a wireless system is shared amongst a hierarchal tier of entities such as service providers and one or more incumbent entities. A communication management resource (such as communication management hardware, communication management software, or combination of communication management hardware and communication management software) receives notification that a second-tier priority entity has been allocated use of a second wireless spectrum as a replacement to first wireless spectrum. In one embodiment, the first wireless spectrum is revoked from the second-tier priority entity based on use of the first wireless spectrum by a first-tier priority incumbent entity. The first-tier priority entity has higher priority rights than the second-tier priority entity. The communication management resource controls a wireless transmit power level of a third-tier priority entity in the hierarchy to provide protected use of the second wireless spectrum by the second-tier priority entity. The second-tier priority entity has higher priority rights than the third-tier priority entity In further example embodiments, control of the wireless transmit power level of the third-tier priority entity includes controlling a power level of wireless communications transmitted by a wireless base station operated by the third-tier priority entity.

Still further example embodiments include, via the communication management resource, receiving an identity of a first wireless base station operated by the second-tier priority entity; determining a region of wireless coverage provided by the first wireless base station; and controlling a power level of wireless communications transmitted by a second wireless base station (which is operated by the third-tier priority entity) to reduce wireless interference caused by the second wireless base station in the first region of wireless coverage. In one embodiment, both the first wireless base station and the second wireless base station transmit the wireless communications in the first wireless spectrum.

Still further example embodiments include, via the communication management resource, receiving an identity of a first wireless base station operated by the second-tier priority entity; determining a region of wireless coverage provided by the first wireless base station; and controlling a power level of wireless communications transmitted by a second wireless base station operated by the third-tier priority entity to reduce wireless interference caused by the second wireless base station in the first region of wireless coverage. In one embodiment, both the first wireless base station and the second wireless base station transmit the wireless communications in the first wireless spectrum.

Further embodiments herein include, via the communication management resource, receiving identities of multiple wireless base stations operated by the second-tier priority entity using the second wireless spectrum. The communication management resource determines a first region of wireless coverage provided by multiple wireless base stations and controls a power level of wireless communications transmitted by a second wireless base station operated by the third-tier priority entity to reduce wireless interference caused by the second wireless base station in the first region of wireless coverage.

In yet further example embodiments, control of the wireless transmit power level by the third-tier priority entity includes: identifying a first region of wireless coverage provided by the second-tier priority entity using the second wireless spectrum; identifying a second region of wireless coverage provided by the third-tier priority entity; and then determining an overlap region between the first region of wireless coverage and the second region of wireless coverage.

Note that the first region of wireless coverage can be configured to represent an ability to provide wireless connectivity by one or more base stations. For example, in one embodiment, the first region of wireless coverage represents a region supported by a single wireless base station operated by the second-tier priority entity. Alternatively, the first region of wireless coverage represents a region supported by multiple wireless base stations operated by the second-tier priority entity.

Control of the wireless transmit power level by the third tier entity can be implemented in any suitable manner. In one embodiment, the communication management resource compares a size of the overlap region to a threshold size. The communication management resource controls a wireless power level of a third-tier priority entity in corresponding base station based on the comparison. For example, in response to detecting that the size of the overlap region is greater than the threshold size, the communication management resource reduces a magnitude of the wireless transmit power level of the third-tier priority entity using the second wireless spectrum.

In still further example embodiments, the second-tier priority entity such as a PAL (Priority Access Licensed) entity is granted use of the second wireless spectrum based on a license assigned to the second-tier priority entity; the second-tier priority entity is afforded protected use of the second wireless spectrum from the third-tier priority entity based on the license. The third-tier priority entity such as a GAA (General Authorized Access) entity is a non-licensed entity in the hierarchy. The first-tier priority user is an incumbent entity in the wireless system implementing use of a CBRS (Citizen Band Radio Service) band or other suitable band.

In further example embodiments, the second-tier priority entity is registered with a first allocation management resource (such as first spectrum access system). The third-tier priority entity is registered with a second allocation management resource (such as a second spectrum access system). In such an instance, the second allocation management resource receives the notification that the second-tier priority entity has been allocated use of a second wireless spectrum as a replacement to first wireless spectrum and controls a wireless transmit power level of a third-tier priority entity in the hierarchy to provide protected use of the second wireless spectrum by the second-tier priority entity.

In still further example embodiments, controlling the wireless transmit power level of the third-tier priority entity includes: receiving identities of multiple wireless base stations operated by the second-tier priority entity using the second wireless spectrum; determining a first region of wireless coverage provided by multiple wireless base stations; and controlling a power level of wireless communications transmitted by a second wireless base station operated by the third-tier priority entity to reduce wireless interference caused by the second wireless base station in the first region of wireless coverage.

In further example embodiments, the communication management hardware (such as communication management entity or other suitable resource): receives a first region of wireless coverage provided by multiple wireless base stations operated by the second-tier priority entity; and controls a power level of wireless communications transmitted by a wireless base station operated by the third-tier priority entity to reduce wireless interference caused by the second wireless base station in the first region of wireless coverage.

Thus, embodiments herein provide novel ways of providing improved use of wireless channels and protection amongst different entities sharing use of spectrum in a wireless network environment.

Note that any of the resources as discussed herein can include one or more computerized devices, mobile communication devices, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, executable instructions, etc., that supports operations as discussed herein.

One embodiment includes a computer readable storage medium and/or system having instructions stored thereon to facilitate wireless communications in a network environment. The instructions, when executed by computer processor hardware, cause the computer processor hardware (such as one or more co-located or disparately processor devices) to: in a wireless system shared amongst a hierarchy of users: receive notification that a second-tier priority entity in a hierarchy has been allocated use of a second wireless spectrum as an alternative to first wireless spectrum, the first wireless spectrum revoked from the second-tier priority user by a first-tier priority user; and control a wireless power level of a third-tier priority user in the hierarchy to provide protected use of the second wireless spectrum by the second-tier priority user.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of providing improved wireless services to communication devices. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention (s), the reader is directed to the Detailed Description section (which is a summary of embodiments) and corresponding figures of the present disclosure as further discussed below.

Figure 1:
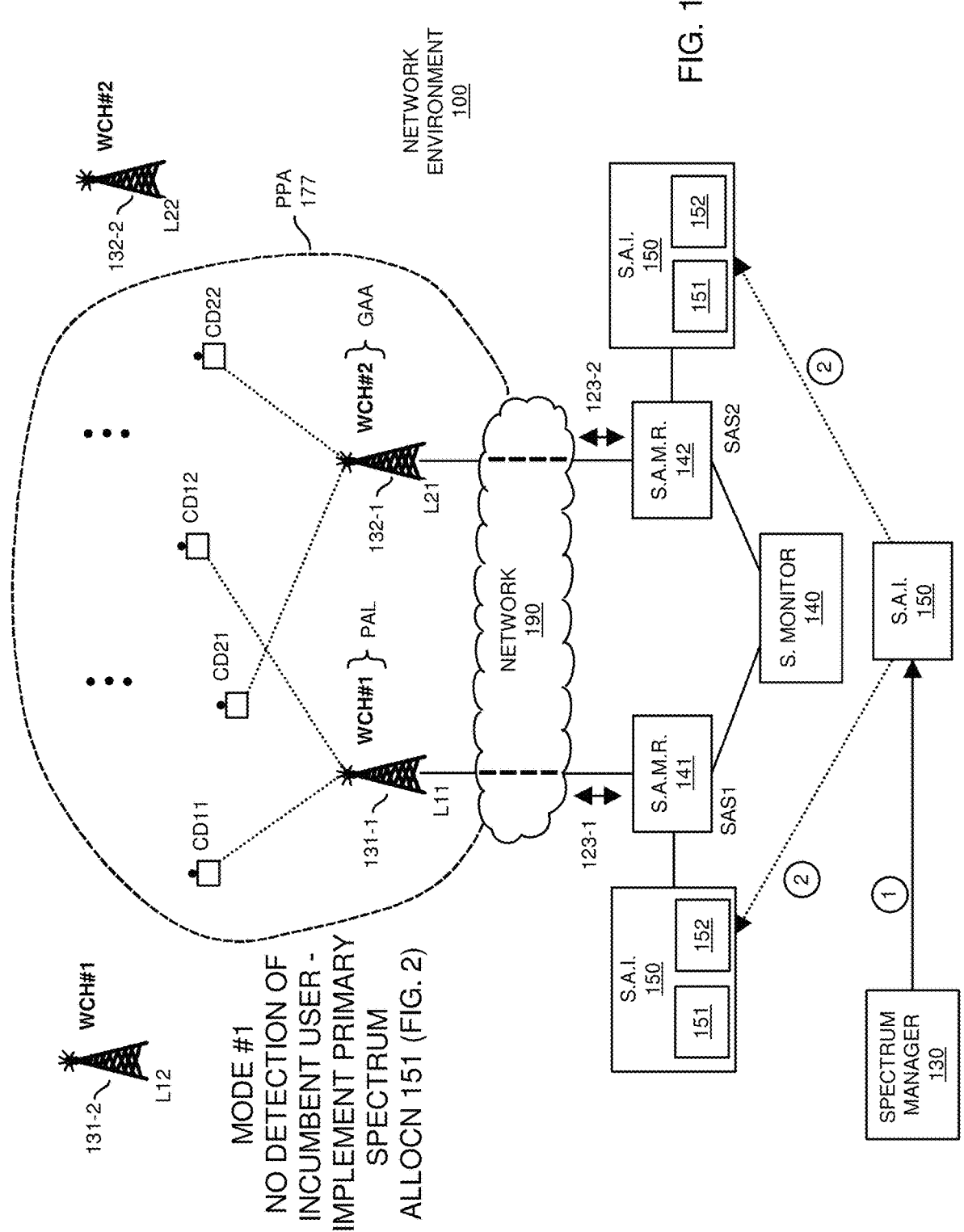
FIG. 1 is an example diagram illustrating a wireless network environment implementing hierarchical wireless spectrum allocation according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

Priority Access License (PAL) holders (such as entities) purchase wireless licenses and reserve the right to use them in corresponding pre-determined geographical areas of operation. If there are PAL operators (i.e., licensed operators) in a CBRS network, the main purpose of SAS (Spectrum Access System) is to protect these PAL holders (licensed wireless network entities) from the interference generated by other users in the network. Another purpose of the spectrum access system is to prevent PAL users and GAA users from using respective wireless channels acquired and used by an incumbent entity.

According to one embodiment, multiple entities (such as users, service providers incumbent entity, etc.) in a tiered hierarchy share use of a wireless spectrum. A communication management resource receives notification that a second-tier priority entity (i.e., an entity assigned the second tier priority) in the hierarchy has been allocated use of a second wireless spectrum as a replacement to first wireless spectrum. Assume that the first wireless spectrum is revoked from the second-tier priority entity based on use of the first wireless spectrum by a first-tier priority entity (such as incumbent entity or first tier priority in the hierarchy). In such an instance, the communication management resource controls a wireless transmit power level of a third-tier priority entity (i.e., an entity assigned the third tier priority) in the hierarchy to provide protected use of the second wireless spectrum by the second-tier priority entity. In one embodiment, control of the wireless transmit power level of the third-tier priority entity includes controlling a power level of wireless communications transmitted by a wireless base station operated by the third-tier priority entity. In one embodiment, control includes decreasing or terminating use of the second wireless spectrum by the third-tier priority entity.

Techniques as described herein are advantageous because licensed operators (such as PAL users) are afforded novel protection via backup spectrum allocation information when a portion of licensed wireless channels are unavailable for use. The methods described herein also allow an allocation management resource such as a spectrum access system to offer protection to PAL service providers (such as CBSDs) with low computational complexity and low information exchange across multiple allocation management resources (spectrum access systems).

Now, more specifically, FIG. 1 is an example diagram illustrating a wireless network environment implementing hierarchical spectrum allocation based on different priority tiers according to embodiments herein.

As shown in this example embodiment, network environment 100 includes spectrum manager 130, spectrum monitor 140, spectrum allocation management resource 141 (such as spectrum access system SAS1), spectrum allocation management resource 142 (such as spectrum access system SAS2), wireless stations 131 (namely, wireless station 131-1, wireless station 131-2, . . . ), wireless stations 132 (namely, wireless station 132-1, wireless station 132-2, . . . ), communication devices CD11, CD12, . . . , communication devices CD21, CD22, . . . , and network 190 (such as including the Internet, wireless infrastructure, etc.).

Each communication device is mobile or stationary with respect to a wireless station providing it access to network 190.

As further shown, wireless station 131-1 (such as operated by a first wireless network service provider, first entity, etc.) is disposed at location L11 providing communication devices CD11, CD12, etc., access to network 190; wireless station 131-2 is disposed at location L12, and so on.

Wireless station 132-1 (such as operated by a second wireless network service provider, second entity, etc.) is disposed at location L21 providing communication devices CD21, CD22, etc., access to network 190; wireless station 132-2 is disposed at location L22, and so on.

In one embodiment, the wireless base station 131-1 operates in a so-called PPA 177 (i.e., PAL Protection Area or licensed protection area) in which the spectrum allocation management resource 141, spectrum allocation management resource 142, etc., protect use of the PAL users (second-tier priority entity such as service providers, etc.) and corresponding use of allocated licensed wireless channels. As further discussed herein, protection includes reducing a likelihood that any PAL users (licensed users) in the PPA 177 experience wireless interference from other wireless stations (non-licensed entities).

In further example embodiments, in the network environment 100 and PPA 177, an incumbent user (such as a first-tier priority entity) has highest priority rights to use respective wireless channels. If the spectrum monitor 140 detects use of one or more wireless channels by higher priority users such as the first-tier priority entity or a so-called incumbent entity, the spectrum monitor 140 notifies the spectrum allocation management resources 141 and 142 of this condition. One or more of the spectrum allocation management resources 141 and 142, in turn, notify (such as immediately or within a short timeframe such as a few minutes) the wireless stations (and corresponding wireless network service providers) to discontinue use of such wireless channels used by the incumbent entity such as a first-tier priority entity.

In still further embodiments, each of the spectrum allocation management resources individually or collectively keeps track of a respective location of each of the wireless stations and allocated wireless channels such that two or more wireless stations implementing wireless communications do not interfere with each other. For example, in one embodiment, the spectrum allocation management resources allocate different wireless channels to wireless stations that are in the same location or geographical region to prevent occurrence of wireless interference.

Note that each of the resources (such as wireless stations, communication devices, spectrum allocation management resources, spectrum monitor, spectrum manager, etc.) in network environment 100 can be configured to include appropriate hardware, software, or combination of hardware and software to carry out respective operations as discussed herein.

For example, spectrum manager 130 can be configured as spectrum manager hardware, spectrum manager software, or a combination of spectrum manager hardware and spectrum manager software; spectrum monitor 140 can be configured as spectrum monitor hardware, spectrum monitor software, or a combination of spectrum monitor hardware and spectrum monitor software; spectrum allocation management resource 141 (such as a communication management resource) can be configured as spectrum allocation management hardware, spectrum allocation management software, or a combination of spectrum allocation management hardware and spectrum allocation management software; spectrum allocation management resource 142 (such as communication management resource) can be configured as spectrum allocation management hardware, spectrum allocation management software, or a combination of spectrum allocation management hardware and spectrum allocation management software; wireless station 131-1 (such as a communication management resource) can be configured as wireless station hardware, wireless station software, or a combination of wireless station hardware and wireless station software; wireless station 132-1 (such as a communication management resource) can be configured as wireless station hardware, wireless station software, or a combination of wireless station hardware and wireless station software; and so on.

During further operation, the spectrum manager 130 produces spectrum allocation information 150 indicating allocation of spectrum to each of the wireless stations in network environment 100.

In this example embodiment, the spectrum manager 130 distributes the spectrum allocation information 150 to each of one or more spectrum allocation management resource 141 (such as SAS1) and spectrum allocation management resource 142 (such as SAS2).

For example, the spectrum manager 130 or other suitable entity distributes the spectrum allocation information 150 (predetermined wireless channel allocation information) including primary spectrum allocation information 151 and the backup spectrum allocation information 152 to multiple instances of spectrum allocation management resources such as including spectrum allocation management resource 141 (such as a first spectrum access system providing spectrum allocation to a first wireless network service provider operating the wireless station 131-1, 131-2, etc.) and spectrum allocation management resource 142 (such as a second spectrum access system providing spectrum allocation to a second wireless network service provider operating the wireless stations 132-1, 132-2, etc.).

In one embodiment, the spectrum allocation management resources periodically communicate with each other to synchronize use of wireless channels so that the respective users do not interference with each other.

Note further that the spectrum allocation management resources (such as communication management hardware, software, etc., receiving the spectrum allocation information 150) as discussed herein can be implemented in any suitable manner.

For example, in one embodiment, the spectrum allocation management resource 141 and the second spectrum allocation management resource 142 can be disparately located with respect to each other. Alternatively, the spectrum allocation management resources can be combined into a single spectrum allocation management resource (such as a single SAS resource) disposed at a central location to control operation of wireless channels to wireless stations operated by different wireless network service providers.

The different wireless network service providers subscribe to wireless channel (such as wireless spectrum, bandwidth, wireless channels, etc.) allocation services provided by the spectrum allocation management resources. For example, certain users (i.e., wireless network service providers such as PAL entities) pay a fee for a license to use wireless spectrum.

As discussed herein, coordination and implementation of the spectrum allocation information 150 (such as primary spectrum allocation information 151 and backup spectrum allocation information 152) to control wireless stations operated by multiple wireless network service providers (such as PAL users and GAA users) ensures fair use of corresponding available spectrum (wireless channels #1-10).

In this example embodiment, the incumbent entity is a first-tier priority user in the priority hierarchy, the PAL users are second-tier priority users in the priority hierarchy, and the GAA users are third-tier priority users in the priority hierarchy.

In the hierarchy, the incumbent users (first-tier priority entities) have highest priority access rights; the PAL users (second-tier priority entities) have second highest priority access rights; the GAA users (third-tier priority entities) have the lowest priority access rights.

The wireless stations in network environment 100 can be operated by any number of multiple different service providers. For example, in one embodiment, the first wireless stations 131-1, 131-2, etc., are operated by a first wireless network service provider (second-tier priority user or PAL user); the first wireless network service provider has a license (such as via paying a license fee) to use the first wireless spectrum.

The second wireless stations 132-1, 132-2, etc., are operated by a second wireless network service provider (third-tier priority entity or GAA entity); the second wireless network service provider being a non-licensed entity of the second spectrum.

Licensed entities (wireless network service providers and corresponding wireless stations such as second-tier priority entities) are assigned a higher priority to use wireless channels 1-10 (in the licensed wireless channel band) than non-licensed entities (third-tier priority entities).

In still further example embodiments, note that the one or more allocation management resource (such as 141, 142, etc.) can be configured to notify one or more second second-tier priority entities (such as wireless station 131-1, 131-2, etc.) in the wireless system about temporary spectrum assignments (such as based on primary allocation information 151 and backup allocation information 152) in advance of implementing a reallocation of wireless spectrum. In one embodiment, the second-tier priority entities configure their user equipment (such as wireless stations) for appropriate bandwidth parts to use for switching between the primary and temporary spectrum assignments.

Figure 2:
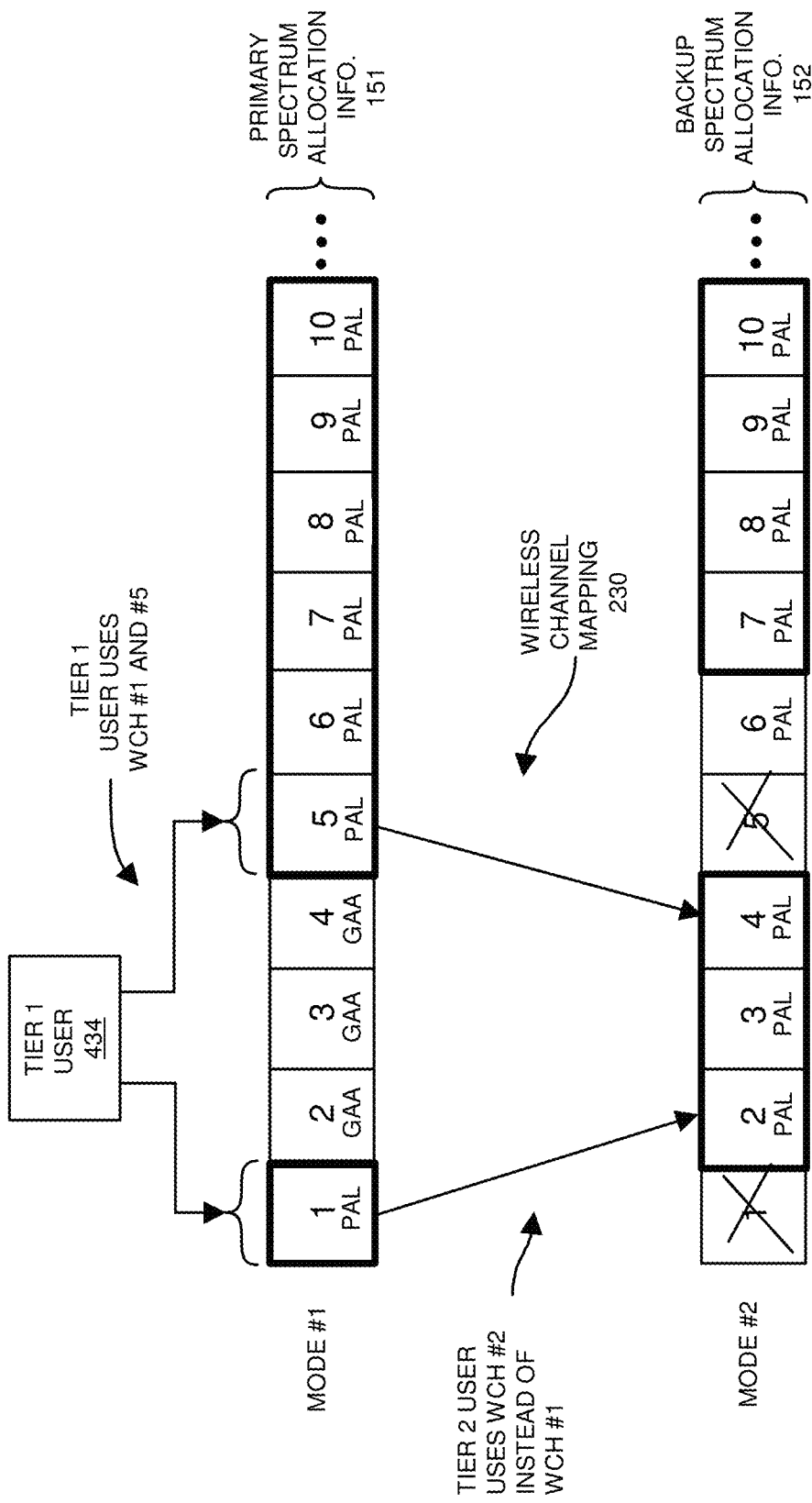
FIG. 2 is an example diagram illustrating channel allocation information and switchover from a primary spectrum allocation to a backup wireless spectrum allocation according to embodiments herein.

As further shown in FIG. 2, even though a portion (such as 7 channels) of the wireless channels 1-10 are allocated/reserved for use by licensed entities, different portions of the licensed spectrum of wireless channels 1-10 are allocated for use by different PAL (licensed wireless network service providers) and GAA entities (unlicensed wireless network service providers) depending on which of the wireless channels 1-10 are available for use in the spectrum hierarchy.

FIG. 2 is an example diagram illustrating primary channel allocation information and backup channel allocation information according to embodiments herein.

In this example embodiment, the spectrum allocation information 150 includes primary spectrum allocation information 151 and backup spectrum allocation information 152.

In general, the first or primary spectrum allocation information 151 is implemented during conditions in which none of the wireless channels 1-10 are used by an incumbent entity. The backup spectrum allocation information 152 is implemented during conditions in which one or more of the wireless channels 1-10 are unavailable due to use of respective wireless channels by an incumbent entity (i.e., higher priority user).

The wireless spectrum as discussed herein includes any number of one or more wireless channels.

For example, assume in this example embodiment that the first spectrum allocated to the wireless station 131-1 includes wireless channel #1 assigned for use by the first wireless station 131-1 (second-tier priority entity) during the first condition of all wireless channels #1-10 being available for use by PAL and GAA users. The primary spectrum allocation information 151 also includes a second wireless spectrum such as wireless channel #2 assigned for use by the second wireless station 132-1 (third-tier priority entity) during the first condition of all wireless channels #1-10 being available for use by PAL and GAA users.

In one embodiment, the wireless channels #2, #3, and #4 represent spectrum allocated to GAA users in the primary spectrum allocation information 151; the wireless channels #1 and #5-10 represent spectrum allocated to PAL users in the primary spectrum allocation information 151 during the first condition.

Thus, even though the wireless channels #1-10 represent licensed wireless channels, only seven wireless channels out of the ten wireless channels are allocated for use by licensed wireless network service providers.

As previously discussed, the spectrum allocation information 150 also includes backup spectrum allocation information 152 for implementation during a second condition when not all of the wireless channels #1-10 are available for users.

For example, in accordance with a backup assignment (secondary spectrum allocation information 152) associated with a first group of wireless channels #1 and #5: i) wireless channel #2 is a backup allocation for wireless channel #1 in the event that wireless channel #1 is not available for use by a respective licensed entity by a respective licensed entity; ii) wireless channel #4 is a backup allocation for wireless channel #5 in the event that wireless channel #5 is not available for use.

In one embodiment, the spectrum manager 130 chooses which of the wireless channels to include in the first group and the second group based on the likelihood of the wireless channels being reallocated during incumbent use.

In still further example embodiments, the wireless channels #1-10 are ten of sixteen wireless channels available from a tiered wireless channel hierarchy (such as a CBRS band further discussed in FIG. 10 and corresponding text) in which a first wireless network service provider operating the first wireless stations 131-1, 131-2, etc., has higher priority access rights to use of the wireless spectrum channels #1-10 than a second wireless network service provider operating the second wireless stations 132-1, 132-2, etc.

In other words, as discussed herein, because the wireless channels are allocated from a tiered channel hierarchy, one or more of the wireless channels #2 and #4 are deallocated from an unlicensed wireless network service provider (GAA, non-licensed user) and re-allocated to a licensed wireless network service provider (PAL, licensed user) during backup conditions when the incumbent entity uses the wireless channels #1 or #5.

Thus, implementation of the backup or secondary spectrum allocation information 152 provides spectrum usage protection to the first wireless network service provider operating wireless base station 131-1, 131-2, etc., granted a license to use all or a portion of the wireless channels #1-10. In other words, if a portion of the first wireless spectrum becomes unavailable for use by the first wireless stations 131-1, 131-2, etc., operated by the first wireless network service provider in the protection area 177, the first wireless stations (and corresponding first wireless network service provider) are allocated use of the backup wireless spectrum assignment as indicated by the secondary spectrum allocation information 152.

Referring again to FIG. 1, as previously discussed, via the spectrum manager 130, the spectrum allocation management resource 141 (such as communication management hardware, communication management software, or combination of both) receives notification of primary spectrum allocation information 151 and backup spectrum allocation information 152. Thus, in one embodiment, the temporary spectrum assignments as specified by the secondary spectrum allocation information 152 for second-tier priority users and third-tier priority users are pre-determined and are consistent across all spectrum access systems (such as SAS1, SAS2, etc.) providing allocation service in a service area.

Spectrum allocation management resource 142 (such as communication management hardware, communication management software, or combination of both) also receives notification of primary spectrum allocation information 151 and secondary (backup) spectrum allocation information 152.

Each of the spectrum allocation management resources 141 and 142 control use of the wireless channels #1-10 in accordance with the spectrum allocation information 150 depending on the current operating conditions of network environment 100.

For example, in one embodiment, the spectrum monitor 140 (such as an ESC or Environmental Sensing Capability) monitors use of the available wireless channels 1-10 by higher priority users. In one nonlimiting example embodiment, the spectrum monitor 140 is or includes a network of sensors used to detect federal frequency use in the 3550-3650 MHz band (or other suitable band) in protection zones where military radar systems can operate.

In FIG. 1, assume that the spectrum monitor 140 does not detect use by a higher priority user (e.g., incumbent, government, etc.).

As shown, via communication 123-1, the wireless station 131-1 (such as operated by a second-tier priority wireless network service provider) registers with the spectrum allocation management resource 141. Subsequent to registration, the wireless station 131-1 communicates with the spectrum allocation management resource 141 for allocation of spectrum (such as one or more wireless channels). In this example embodiment, as indicated by the spectrum allocation information 151, the spectrum allocation management resource 141 allocates wireless station 131-1 use of wireless channel #1. In a similar manner, the wireless base station 131-2 communicates with the spectrum allocation management resource 141 to register for use of wireless spectrum such as allocated wireless channel #1.

As shown, via communication 123-2, the wireless station 132-1 (such as operated by a third-tier priority wireless network service provider) registers with the spectrum allocation management resource 142. Subsequent to registration, the wireless station 132-1 communicates with the spectrum allocation management resource 142 for allocation of spectrum (such as one or more wireless channels). In this example embodiment, as indicated by the spectrum allocation information 151, the spectrum allocation management resource 142 allocates wireless station 132-1 use of wireless channels #2 during absence of the incumbent entity using any wireless channels.

Thus, initially, during the first mode when all wireless channels #1-10 are available, the spectrum allocation management resource 141 implements usage of wireless channels #1-10 in accordance with the primary spectrum allocation information 151 via: i) allocation of first wireless spectrum (such as wireless channel #1) to first wireless station 131-1 and the second wireless station 131-2, and ii) allocation of second wireless spectrum (such as wireless channel #2) to a second wireless station 132-1 and wireless station 132-2 in a network environment 100.

Figure 3:
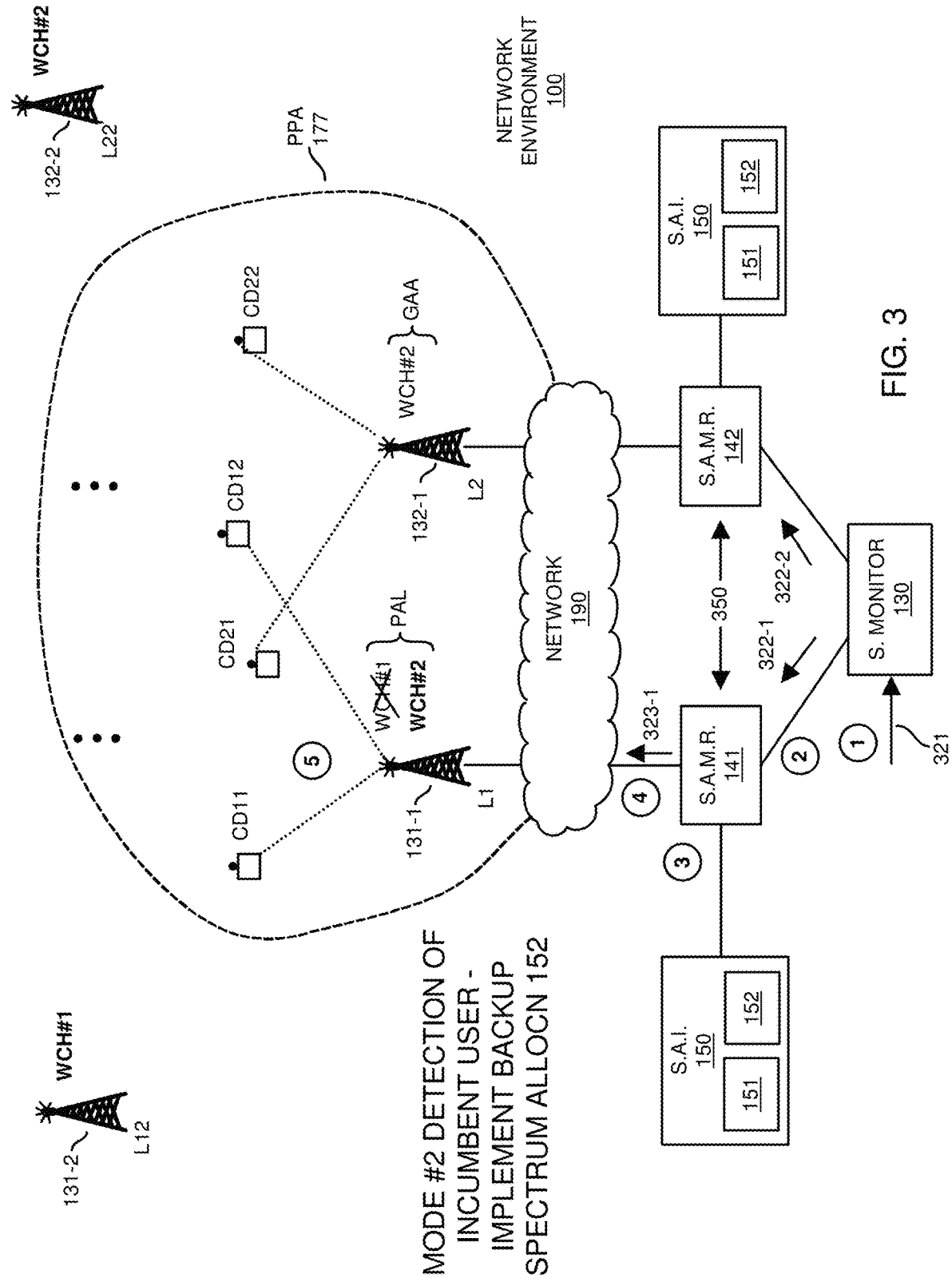
FIG. 3 is an example diagram illustrating a trigger event and implementation of secondary wireless spectrum allocation according to embodiments herein.

FIG. 3 is an example diagram illustrating detection of a trigger event and implementation of backup spectrum allocation information according to embodiments herein.

As further shown in FIG. 3, via input 321 (such as detected uses of wireless channel #1 by a respective incumbent entity), the spectrum monitor 130 detects a trigger event such as use of wireless channel #1 by a respective incumbent user. More specifically, in one embodiment, the trigger event use of wireless channel #1 itself or notification indicating use of the first wireless spectrum (such as wireless channel 1) by a spectrum user (first-tier priority user) having higher priority rights than the first wireless network service provider (second-priority tier user) operating the wireless station 131-1.

In such an instance, in response to the trigger event, the spectrum monitor 130 transmits communications 322-1 and 322-2 to the spectrum allocation management resources 141 and 142. The communications 322 (indicating the need or use of wireless channel #1 by the incumbent entity) causes the spectrum allocation management resources 141 and 142 to implement the backup spectrum allocation information in the PPA 177 (licensed protection area) so that the wireless network service provider operating the wireless base station 131-1 is provided protection and continued allocation of wireless spectrum.

For example, in response to detecting the trigger event as indicated by the communications 322 (communications 322-1 and communications 322-2), and determining that both the first wireless station 131-1 and the second wireless station 132-1 are in a same geographical region (subject to wireless interference with respect to each other in a PPA 177), the spectrum allocation management resources implement the backup spectrum allocation information 152 in the PPA 177.

In one embodiment, because the wireless base station 131-2 and wireless base station 132-2 reside outside the PPA 177, there is no need to adjust use of such wireless channels allocated to them.

In accordance with the backup spectrum allocation information 152, in response to receiving communication 322-1, the spectrum allocation management resource 141 notifies (via communications 323-1) the first wireless station 131-1 to discontinue use of the first wireless spectrum (wireless channel #1) and to use second wireless spectrum (wireless channel #2) to transmit wireless communications in the network environment 100 to communication devices CD11, CD12, etc.

In accordance with further example embodiments, if the spectrum allocation management resource 141 or spectrum allocation management resource 142 is unaware of a backup allocation event such as due to not receiving communications 322 from the spectrum monitor 130, the respective spectrum allocation management resource may continue use of the wireless channels as usual without protecting a PAL protection area in the assigned backup PAL channels until a next CPAS (Coordinated Periodic Activities among SASs) cycle supporting communications 350.

In one embodiment, CPAS communications (such as communications 350) represent a daily, occasional, periodic, etc., process in which all spectrum allocation management resources in network environment 100 synchronize allocation of wireless channels to ensure protection of incumbent entities. For example, the spectrum allocation management resources avoid allocating use of a particular wireless channel if it is unavailable due to use by an incumbent entity.

Thus, if the spectrum allocation management resources do not immediately receive notification of an incumbent user via communications 322, the spectrum allocation management resource will learn of such use via communications 350 and implement backup wireless channel usage.

In this example embodiment, it is noted that the spectrum allocation management resource 142 can be one or more multiple spectrum allocation management resources (spectrum access systems) that do not serve (allocate wireless channels to) the wireless base station 131-1. In one embodiment, in response to receiving notification at the spectrum allocation management resource 142 that a first-priority tier entity temporarily needs access to spectrum such as wireless channel #1 assigned to a second-priority tier 2 user (such as wireless network service provider operating the wireless base station 131-1) who is not served by the spectrum access system 142, as further discussed herein, the spectrum allocation management resource 142 provides protection to the second-priority tier 2 user operating wireless base station 131-1 and use of wireless channel #2 in accordance with pre-determined temporary spectrum assignments (backup spectral allocation information 152) implemented by the multiple spectrum access systems as discussed herein.

Figure 4:
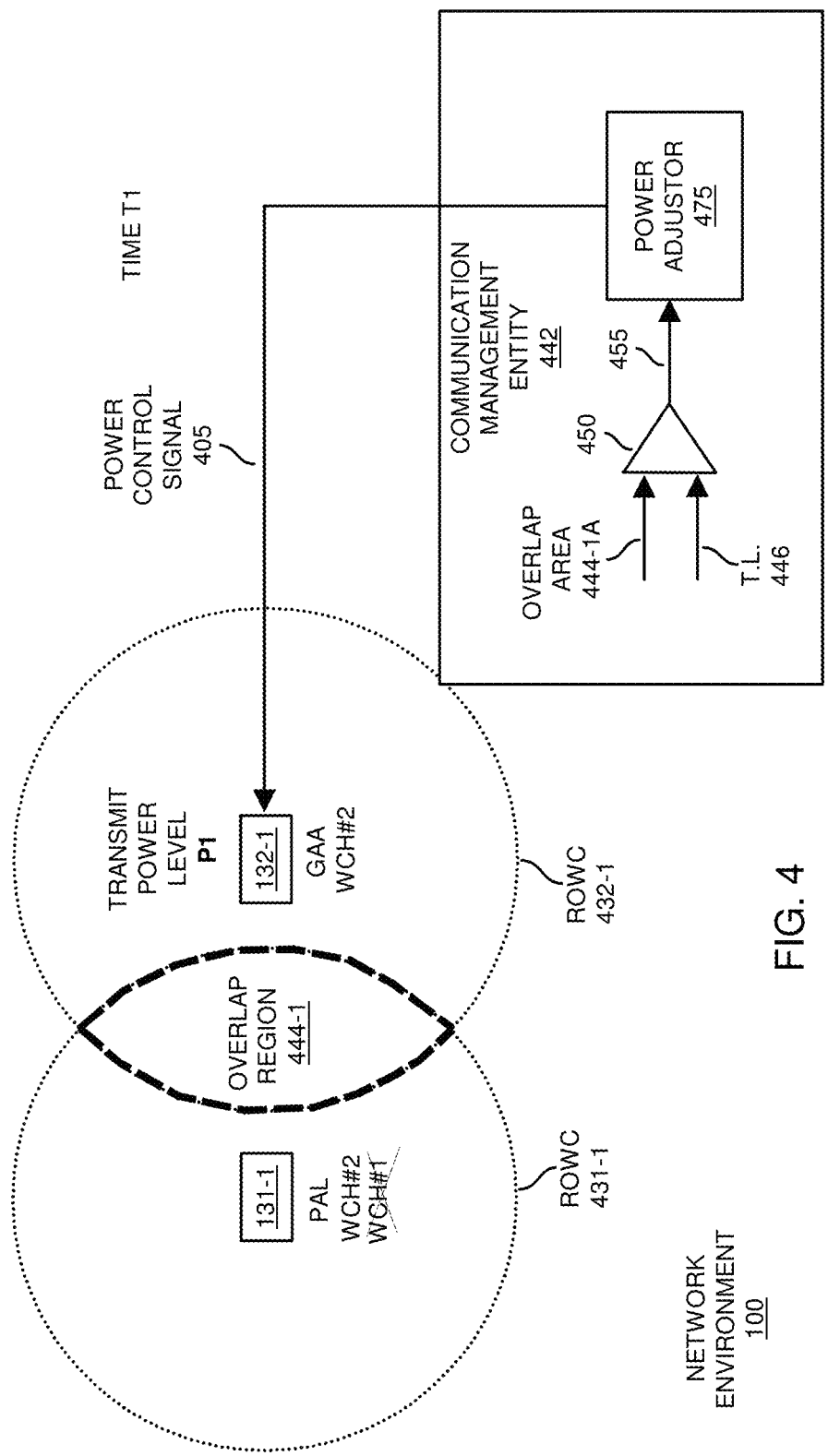
FIG. 4 is an example diagram illustrating detection of an overlap region of wireless interference according to embodiments herein.

FIG. 4 is an example diagram illustrating switchover from implementation of primary spectrum allocation to implementation of backup spectrum allocation and detection of an overlap region of wireless interference according to embodiments herein.

As previously discussed, in response to detecting the trigger event (incumbent use) in which wireless channel #1 (first wireless spectrum) is no longer available for use because the first-tier priority entity temporarily needs use of the first wireless spectrum (such as wireless channel #1), and determining that the first wireless station 131-1 and the second wireless station 132-1 are in a PPA 177 or disposed in the same geographical region: i) the spectrum allocation management resource 142 can be configured to notify the second wireless station 132-1 to discontinue use of the wireless channel #1 to transmit communications in the network environment.

However, according to certain embodiments herein, it is noted that it is desirable to continue to allow the wireless base station 132-1 to continue using wireless channel #2 (even though it is a lowest tier user) if it does not interfere with use of the wireless channel #2 by the wireless base station 131-1.

To this end, in one embodiment, the communication management entity 442 such as associated with the spectrum allocation management resource 142 receives notification or determines that the wireless base station 132-1 is operated in a vicinity of the wireless base station 131-1. In such an instance, the communication management entity 442 implements appropriate monitoring and adjustment to the operations of the wireless base station 132-1 such that it does not interfere with the wireless base station 131-1.

In one embodiment, techniques as described herein allow the allocation management resources or other suitable entity to offer protection to PAL wireless base stations in the PPA 177 via low computational complexity and low information exchange across multiple allocation management resources. For example, in one embodiment, the allocation management resource 142 implements the communication management entity 442 to determine the region of wireless coverage information associated with the use of the wireless base station 131-1.

Further, to this end, the spectrum allocation management resource 142 or other suitable entity receives or determines a respective region of wireless coverage 431-1 provided by the wireless base station 131-1. The region of wireless coverage 431-1 corresponds to a respective range of the wireless base station 131-1 being able to communicate with corresponding communication devices in network environment 100.

The spectrum allocation management resource 142 or other suitable entity such as communication management entity 442 receives notification of or determines a respective region of wireless coverage 432-1 provided by the wireless base station 132-1.

The spectrum allocation management resource 142 then determines overlap area value 444-1A (such as in square meters, feet, or other suitable metric) indicating a size of the overlap region 444-1 associated with the region of wireless coverage 431-1 with respect to the region of wireless coverage 432-1. In general, if the magnitude of the overlap area value 441-1A associated with overlap region 441-1 is very small, negligible, or zero, then the wireless base station 132-1 is free to continue to use the wireless channel #2 at the transmit power level P1 (such as a maximum possible transmit power level).

More specifically, in this example embodiment, to protect the wireless base station 131-1 and corresponding communication devices from experiencing co-channel interference, the communication management entity 442 compares the magnitude of the overlap area value 444-1A to a threshold level 446 representing a maximum allowed overlap area. As previously discussed, if the magnitude of the overlap area value 444-1A is less than the threshold level 446, the comparator 450 produces a respective control signal 455 indicating that there is no need to adjust the transmit power level P1 of the wireless base station 132-1 because there is little to no wireless interference to the wireless base station 131-1.

Conversely, in response to detecting a condition in which the magnitude of the overlap area value 444-1A indicating a size of the overlap region 444-1 is greater than the threshold level 446, the comparator 450 produces the output control signal 455 indicating to adjust the magnitude of the power transmit level associated with the wireless base station 132-1. More specifically, in response to receiving notification that the magnitude of the overlap area value 444-1A is greater than the threshold level 446, the power adjustor 475 communicates the power control signal 405 to the wireless base station 132-1. In this embodiment, the power control signal 405 notifies the wireless base station 132-1 to reduce its respective transmit power level from P1 to P2, where P2>P1. As shown in the following FIG. 5, the reduction in a magnitude of the transmit power level from P1 to P2 results in reducing a respective amount of wireless interference caused by the use of wireless channel #2 by the wireless base station 132-1. In other words, the use of wireless channel #2 by the wireless base station 132-1 minimally affects use of the wireless channel #2 in the region of wireless coverage 431-1 associated with the wireless base station 131-1.

Figure 5:
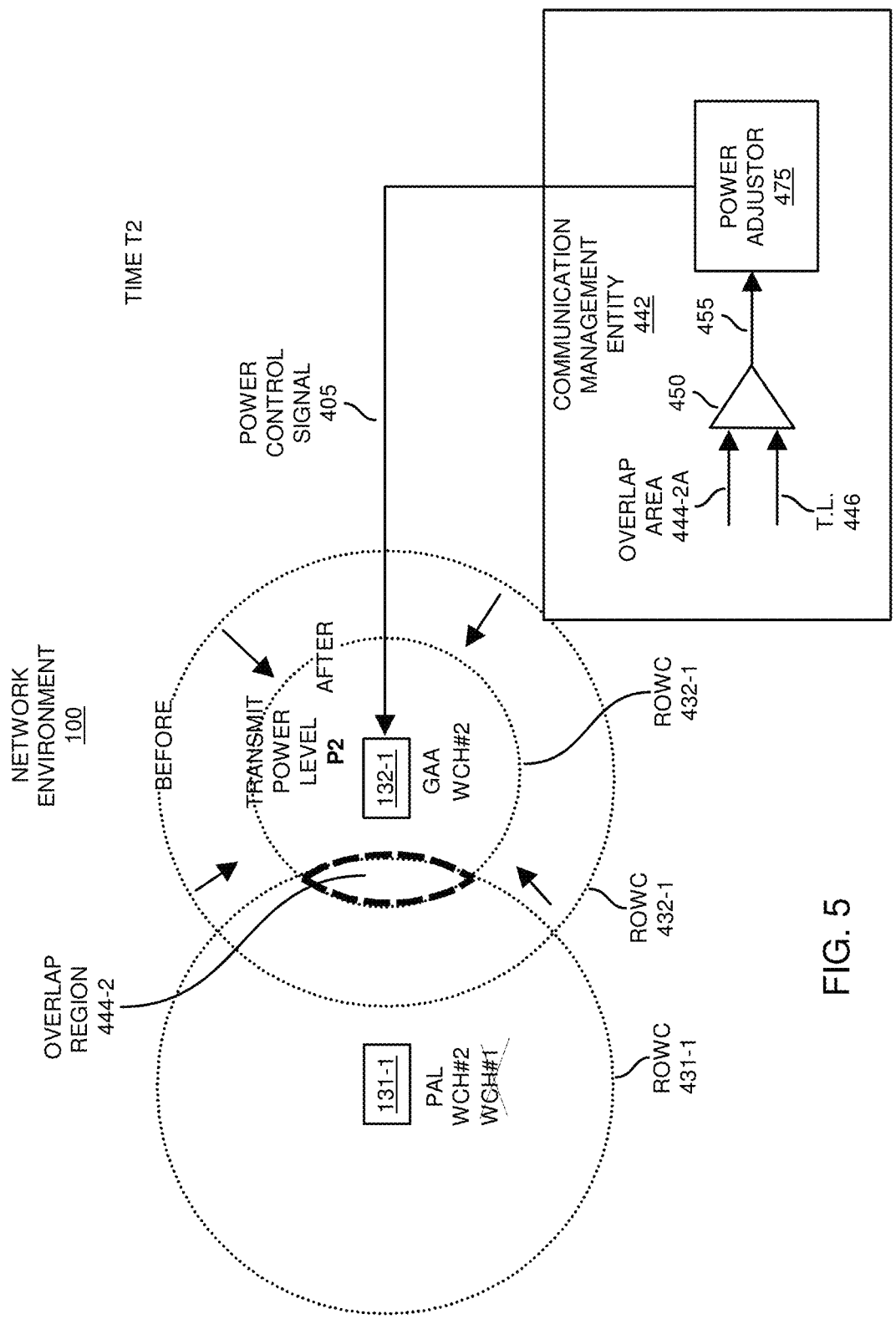
FIG. 5 is an example diagram illustrating adjustment of a transmit power level from a wireless base station to reduce an overlap region and corresponding wireless interference according to embodiments herein.

FIG. 5 is an example diagram illustrating adjustment of a transmit power level from a wireless base station to reduce an overlap region and corresponding wireless interference according to embodiments herein.

As previously discussed, the power adjustor 475 reduces the power transmit level of wireless base station 132-1 from P1 to P2, resulting in a reduction of the region of wireless coverage 432-1 to region of wireless coverage 432-2. This change in power reduces a magnitude of the overlap region from overlap region 444-1 to overlap region 444-2. The overlap area value 444-2A indicating a size of the overlap region 444-2 is less than or equal to the threshold level 446. In such an instance, the comparator 450 produces the respective output control signal 455 to indicate that there is no need for any further adjustment to the power P2.

Figure 6:
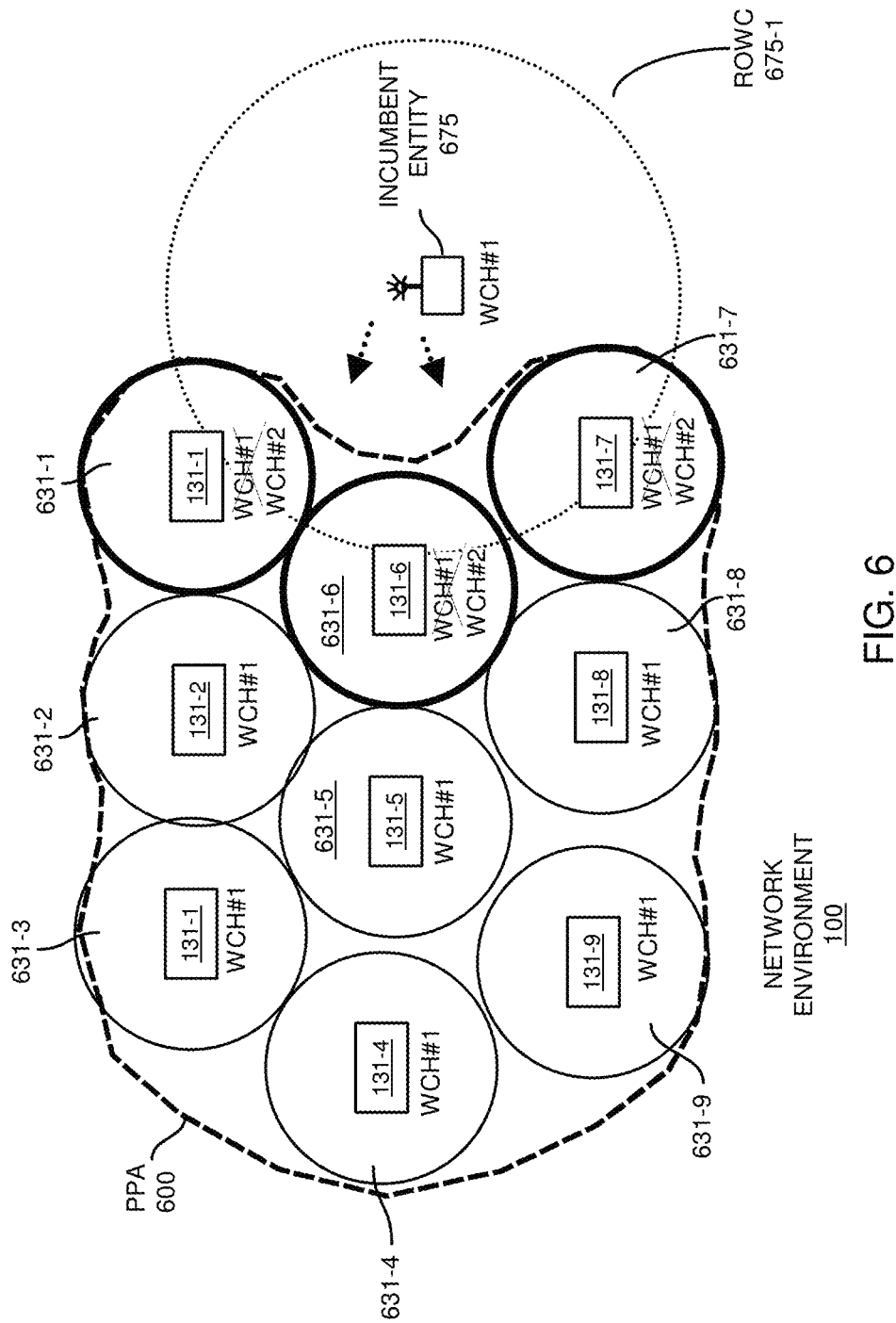
FIG. 6 is an example diagram illustrating a trigger event and discontinued use of a wireless channel according to embodiments herein.

FIG. 6 is an example diagram illustrating a trigger event and discontinued use of a wireless channel by multiple wireless base stations according to embodiments herein.

As previously discussed, the respective incumbent entity can use any of the available wireless channels at any time because it has the highest priority in the respective priority hierarchy.

As shown in FIG. 6, the network environment 100 includes PAL (licensed) protection area 600. The PAL protection area 177 includes operation of multiple wireless base stations 131-1, 131-2, 131-3, 131-4, 131-5, 131-6, 131-7, 131-8, and 131-9. Each of the wireless base stations is operated by the service provider #1 having a respective license to use wireless channel #1 in network environment 100 when there is no use of the wireless channel #1 by incumbent entity 675.

In a similar manner as previously discussed, each of the wireless base stations provides a corresponding region of wireless coverage. For example, prior to detection of the incumbent entity 675 using the wireless channel #1: the wireless base station 131-1 provides region of wireless coverage 631-1 via use of wireless channel #1; the wireless base station 131-2 provides region of wireless coverage 631-2 via use of wireless channel #1; the wireless base station 131-3 provides region of wireless coverage 631-3 via use of wireless channel #1; the wireless base station 131-4 provides region of wireless coverage 631-4 via use of wireless channel #1; the wireless base station 131-5 provides region of wireless coverage 631-5 via use of wireless channel #1; the wireless base station 131-6 provides region of wireless coverage 631-6 via use of wireless channel #1; the wireless base station 131-7 provides region of wireless coverage 631-7 via use of wireless channel #1; the wireless base station 131-8 provides region of wireless coverage 631-8 via use of wireless channel #1; the wireless base station 131-9 provides region of wireless coverage 631-9 via use of wireless channel #1.

As further shown, the pal protection area 600 (geographical region) includes a union or aggregation of regions of wireless coverage 631-1, 631-2, 631-3, 631-4, 631-5, 631-6, 631-7, and 631-8. As previously discussed, the service provider operating the respective wireless base stations 131 is afforded protection from interference by lower tier entities. However, the service provider operating the wireless base stations 131 must also respect use of the wireless channel #1 by the incumbent entity 675.

In one embodiment, the spectrum allocation management resource 141 detects use or receives notification of use of the wireless channel #1 by the incumbent entity 675. In response to this condition, the spectrum allocation management resource 141 detects or determines which of the multiple wireless base stations in the PAL protection area 600 are impacted by the use of wireless channel #1 by the incumbent entity 675.

For example, assume that the spectrum allocation management resource 141 detects that use of the wireless channel #1 by the incumbent entity 675 such as indicated by region of wireless coverage 675-1. Based on knowing which of the wireless base stations in the PAL protection area 600 potentially causes wireless interference to the incumbent entity 675 as indicated by the region of wireless coverage 675-1, the spectrum allocation management resource 141 subdivides the PAL protection area 600 into multiple different regions as further shown in FIG. 7.

Figure 7:
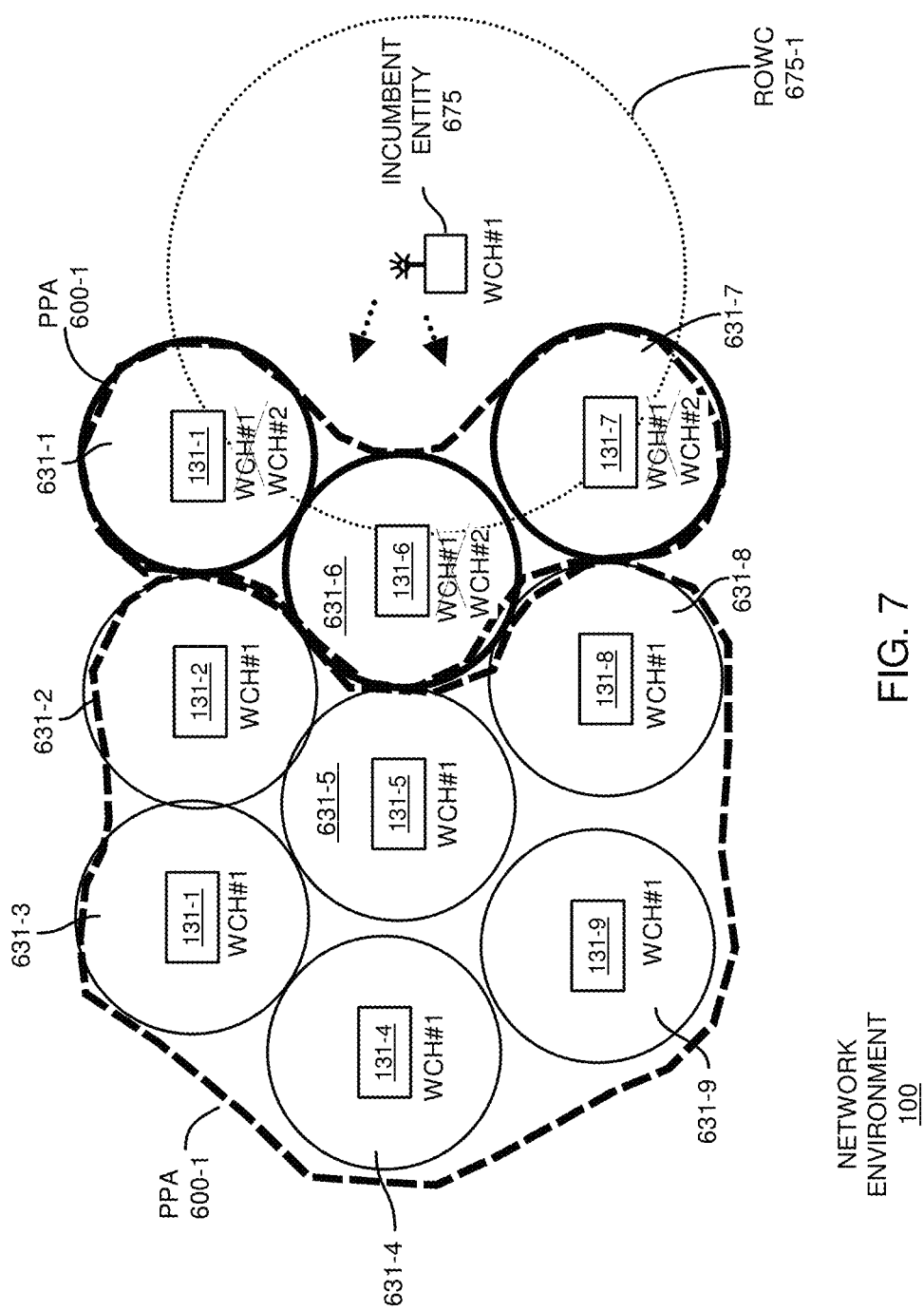
FIG. 7 is an example diagram illustrating partitioning of a licensed entity protection area in response to a trigger event according to embodiments herein.

FIG. 7 is an example diagram illustrating partitioning of a licensed entity protection area into multiple areas in response to a trigger event and according to embodiments herein.

In this example embodiment, in response to detecting that use of the wireless channel #1 by one or more of the wireless base station 131-1, wireless base station 131-5, and wireless base station 131-7, may cause interference to the incumbent entity 675 (based on information such as a location of the incumbent entity, detected wireless energy transmitted by the incumbent entity, etc.), the spectrum allocation management resource 141 (or other suitable communication management entity) partitions the PAL protection area 600 into PAL protection area 600-1 including wireless base stations 131-2, 131-3, 131-4, 131-5, 131-8, and 131-9 and PAL protection area 600-2 including wireless base stations 131-1, 131-6, 131-7.

Figure 8:
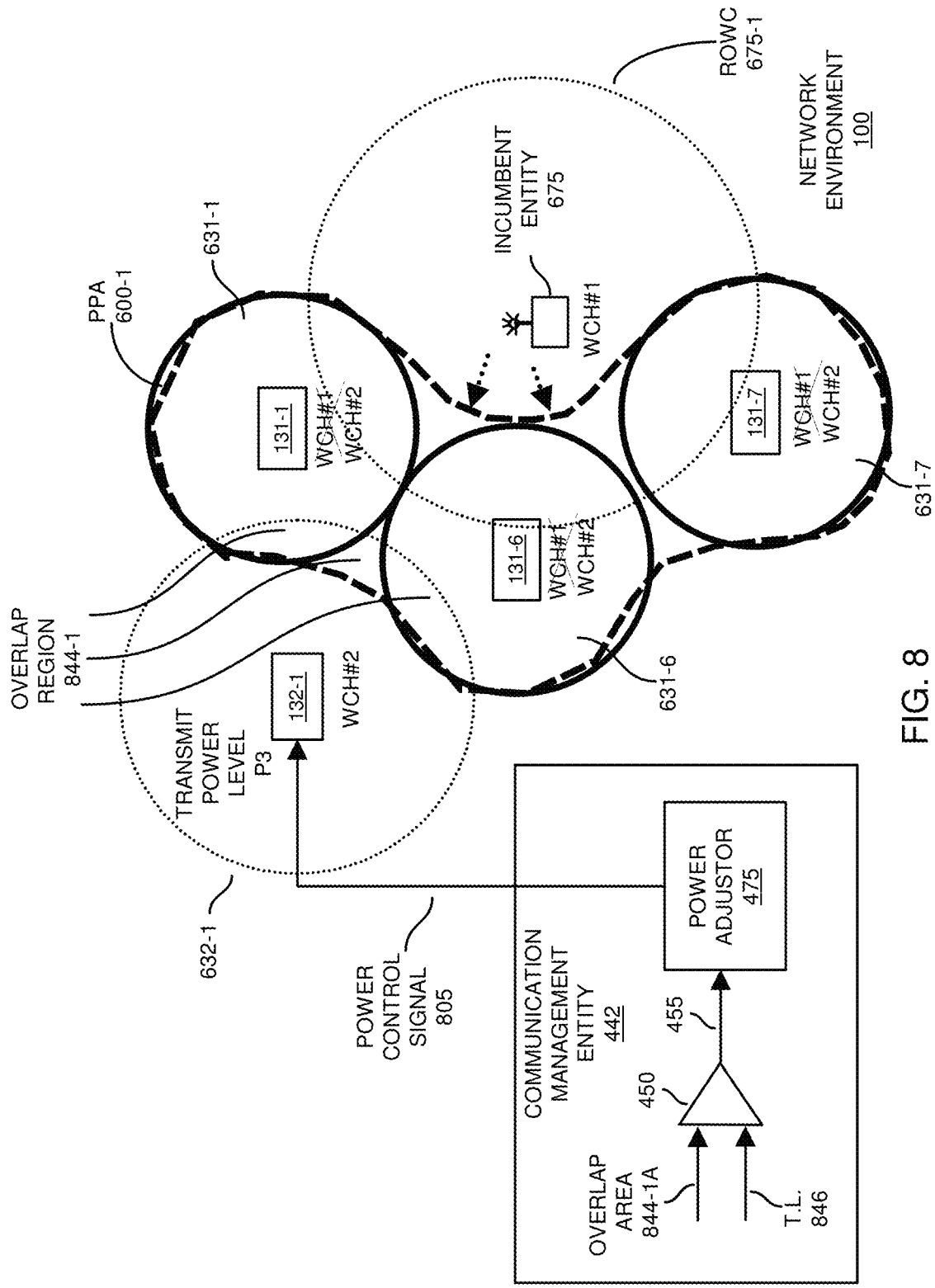
FIG. 8 is an example diagram illustrating detection of an overlap region of wireless interference according to embodiments herein.

FIG. 8 is an example diagram illustrating detection of an overlap region of wireless interference such as based on a union or aggregation of multiple regions of wireless coverage according to embodiments herein.

As previously discussed, in response to detecting the trigger event (incumbent use) in which wireless channel #1 (first wireless spectrum) is no longer available for use because the first-tier priority entity (incumbent entity 675) temporarily uses the first wireless spectrum (wireless channel #1), and determining that the first wireless station 131-1, second wireless base station 131-6, and wireless base station 131-7 are located in the PPA 600-1, the spectrum allocation management resource 141 notifies the wireless base stations

131-1, 131-6, and 131-7 to discontinue use of the wireless channel #1 to transmit communications in the network environment. Further, as previously discussed, in response to detecting use of the wireless channel #1 by the incumbent entity 675, the spectrum allocation management resource 141 notifies the wireless base stations 131-1, 131-6, and 131-7 to use the backup allocated wireless channel #2.

However, according to certain embodiments herein, as previously discussed, it is noted that it is desirable to continue to allow the wireless base station 132-1 (and any other wireless base stations) to continue using wireless channel #2 (even though it is a lowest tier user) if the respective wireless base station 132-1 does not interfere with use of the wireless channel #2 by the wireless base station 131-1.

More specifically, in one embodiment, the spectrum allocation management resource 142 or other suitable entity receives notification that the wireless base station 132-1 is operated in a vicinity of the PAL protection area 600-1. In such an instance, the spectrum allocation management resource 142 implements appropriate monitoring and adjustment to the operations of the wireless base station 132-1 such that it does not interfere with the wireless base stations in the PAL protection area 600-1.

To this end, the spectrum allocation management resource 142 or other suitable entity implements communication management entity 442 to monitor and control operation of the wireless base station 132-1. For example, in one embodiment, the communication management entity 442 determines a respective region of wireless coverage associated with the PPA 600-1. In this example embodiment, the region of wireless coverage associated with the PPA 600-1 corresponds to a union or aggregate of respective ranges of the wireless coverage provided by wireless base stations 131-1, 131-6, and 131-7.

The spectrum allocation management resource 142 or other suitable entity such as communication management entity 442 determines a respective region of wireless coverage 632-1 provided by the wireless base station 132-1.

The communication management entity 442 then determines a respective overlap area value 844-1A indicating a size of the overlap region 844-1 (such as in square meters, feet, or other suitable metric) associated with the region of wireless coverage associated with the PPA 600-1. In general, if the magnitude of the overlap area 844-1A is very small, negligible, or zero, then the wireless base station 132-1 is free to continue to use the wireless channel #2 at the transmit power level P3 (such as a maximum possible transmit power level).

In this example embodiment, to protect the wireless base station 131-1 and corresponding communication devices from experiencing co-channel interference, the communication management entity 442 compares the magnitude of the overlap area value 844-1A associated with the overlap region 844-2 to a threshold level 846 representing a maximum allowed overlap area. If the magnitude of the overlap area value 844-1A is less than the threshold level 846, the comparator 450 produces a respective control signal 455 indicating that there is no need to adjust the transmit power level P3 of the wireless base station 132-1 because there is little to no wireless interference to the wireless base stations in the PPA 600-1.

Conversely, in response to detecting a condition in which the magnitude of the overlap area value 844-1A indicating a size of the overlap region 844-1 is greater than the threshold level 846, the comparator 450 produces the output control signal 455 indicating to adjust the magnitude of the power transmit level associated with the wireless base station 132-1. More specifically, in response to receiving notification that the magnitude of the overlap area value 844-1A is greater than the threshold level 846, the power adjustor 475 communicates the power control signal 405 to the wireless base station 132-1. In this embodiment, the power control signal 805 notifies the wireless base station 132-1 to reduce its respective transmit power level from P3 to P4, where P4<P3. As shown in the following FIG. 9, the reduction in the transmit power level from P3 to P4 results in reducing a respective amount of wireless interference caused by the use of wireless channel #2 buy the wireless base station 132-1.

Figure 9:
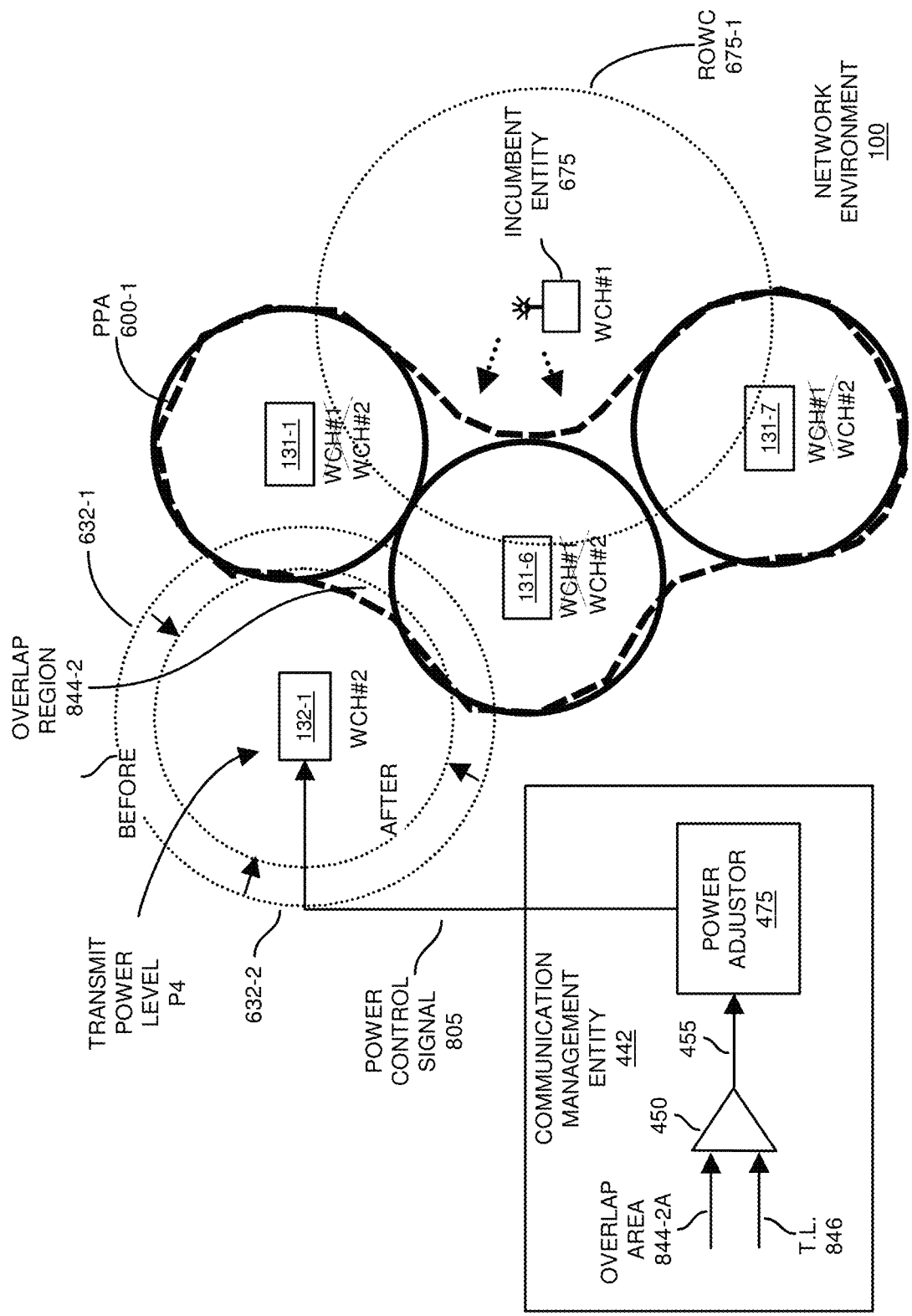
FIG. 9 is an example diagram illustrating adjustment of a transmit power level from a wireless base station to reduce an overlap region and corresponding wireless interference according to embodiments herein.

FIG. 9 is an example diagram illustrating adjustment of a transmit power level from a wireless base station to reduce an overlap region and corresponding wireless interference according to embodiments herein.

As previously discussed, the power adjustor 475 reduces the power transmit level of wireless base station 132-1 from P3 to P4, resulting in a reduction of the region of wireless coverage 432-1 to region of wireless coverage 632-1. This change in power reduces a magnitude of the overlap region from overlap region 844-1 to overlap region 844-2. The overlap area value 844-2A indicating a size of overlap region 844-2 is less than or equal to the threshold level 846. In such an instance, the comparator 450 produces the respective output control signal 455 to indicate that there is no need for any further power adjustment to P4.

Referring again to FIG. 8, note that the overlap area value 844-1A can be a normalized value such as a first value divided by a second value, where the first value indicates a size of the overlap region 844-1 and the second value represents a size of the PPA 600-1. The threshold level 846 is a normalized value such as between zero and 1. As an example, the threshold level 846 may be a normalized value of 0.03 (such as 3%). In such an instance, the communication management entity 442 controls a magnitude of the wireless power provided by the wireless base station 132-1 such that a size of the overlap region 844-1 is no more than 3% of the total area associated with the PPA 600-1.

In one embodiment, the communication management entity 442 (such as management hardware) receives a first region of wireless coverage (such as region specified by the PPA 600-1) provided by multiple wireless base stations 131-1, 131-6, and 131-7. Via the adjustor 475, the communication management entity 442 (such as implemented by the spectrum allocation management resource 142 or other suitable entity) controls a power level (such as reduces power P3 to P4) of wireless communications transmitted by a second wireless base station 132-1 operated by the third-tier priority entity to reduce wireless interference caused by the second wireless base station 132-1 in the first region of wireless coverage) region as indicated by the PPA 600-1 or individual regions of wireless coverage provided by the wireless base station 131-1, 131-6, and 131-7.

Figure 10:
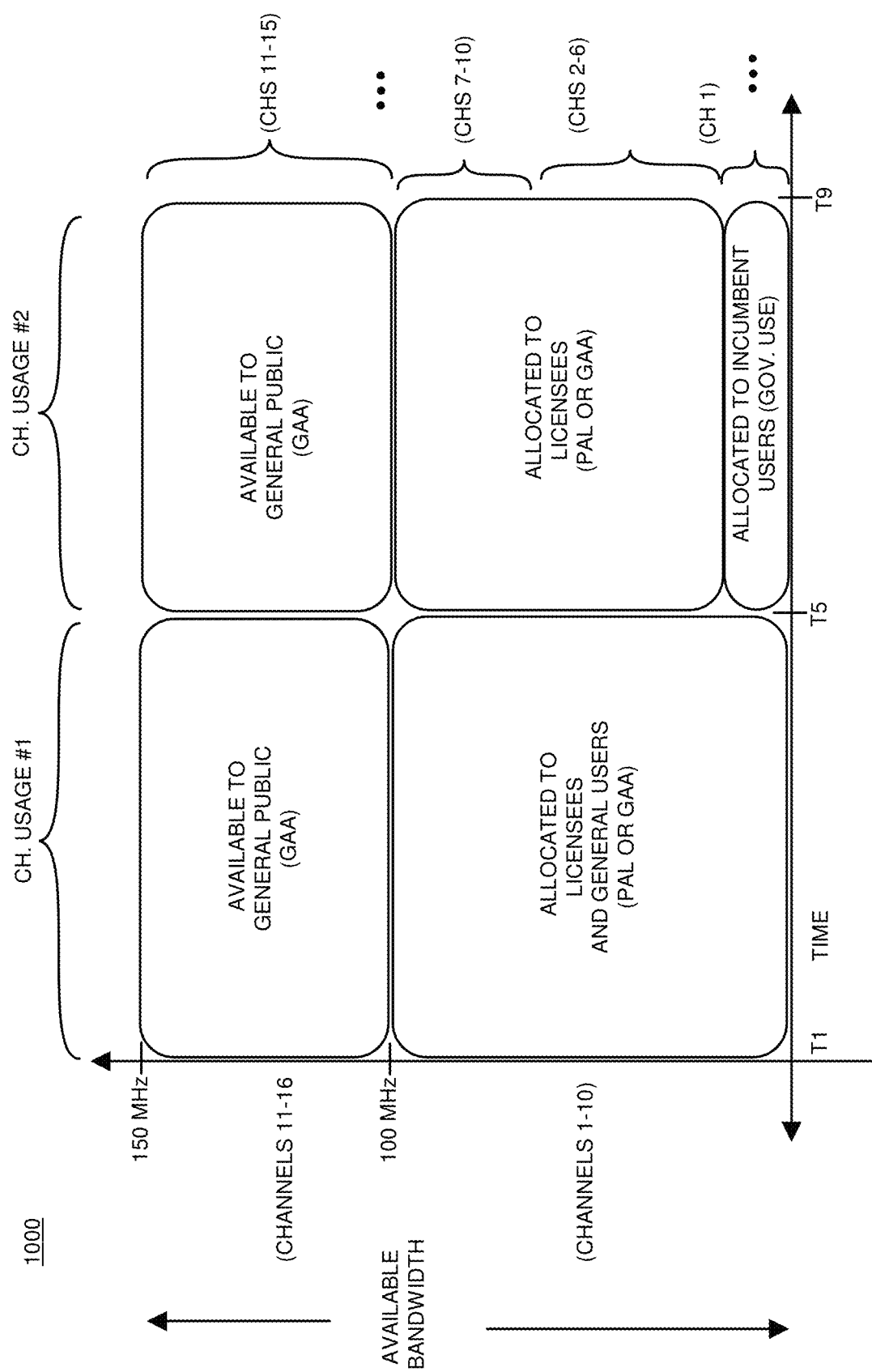
FIG. 10 is an example diagram illustrating allocation of spectrum from a CBRS (Citizen Band Radio Service) according to embodiments herein.

FIG. 10 is an example diagram illustrating generation of dynamic channel allocation information indicating allocation of spectrum at different tiers of a channel hierarchy according to embodiments herein.

As previously discussed, wireless spectrum (bandwidth) manager 130 can be configured to allocate any suitable type of wireless spectrum (spectrum, wireless channels, etc.) for use by the communication devices such as wireless base stations in the network environment 100.

In one non-limiting example embodiment, the bandwidth manager 130 allocates spectrum (wireless channels) from a so-called CBRS (Citizens Band Radio System) band operating between 3.550 and 3.700 GHz (GigaHertz) (such as 150 MegaHertz or 15 wireless channels that are each 10 MHz wide).

Also, as previously discussed, the spectrum allocation management resources 141 and 142 (such as spectrum access systems, allocation management resource, or other suitable entity) keeps track, at any given time, which wireless channels or portions of the multi-tier wireless spectrum or multi-tier radio band (such as CBRS band) are available in the geographical region in which the network environment 100 resides. If government use (such as use via a so-called incumbent user) is detected or requested via appropriate input (such as around time T5) to the allocation management resource 140, certain channels (such as those used by the general public) are no longer available for use as shown in the content access information 195-2.

More specifically, in this example, graph 1000 indicates that between time T1 and time T5 (such as mode #1 or first condition), there is no indication detection of an incumbent user and thus licensed wireless channels 1-10 are available for use by licensed wireless user (and potentially unlicensed GAA users) for use; channels 11-15 are available for use by unlicensed GAA users. In a manner as previously discussed, these channels are allocated for use by the wireless base stations in network environment 100.

As further shown, at or around time T5, assume that the spectrum monitor 140 detects use of the wireless channel #1 by an incumbent entity (first-tier priority user) having higher priority than the PAL users and GAA users. In such an instance, the bandwidth monitor 140 notifies the spectrum allocation management resource 141 and spectrum allocation management resource 142 of such use prompting discontinued use of wireless channel #1 as well as reallocation of wireless channel #2 to the service provider #1 in a manner as previously discussed during conditions in which wireless channel #1 is unavailable due to incumbent entity use.

Figure 11:
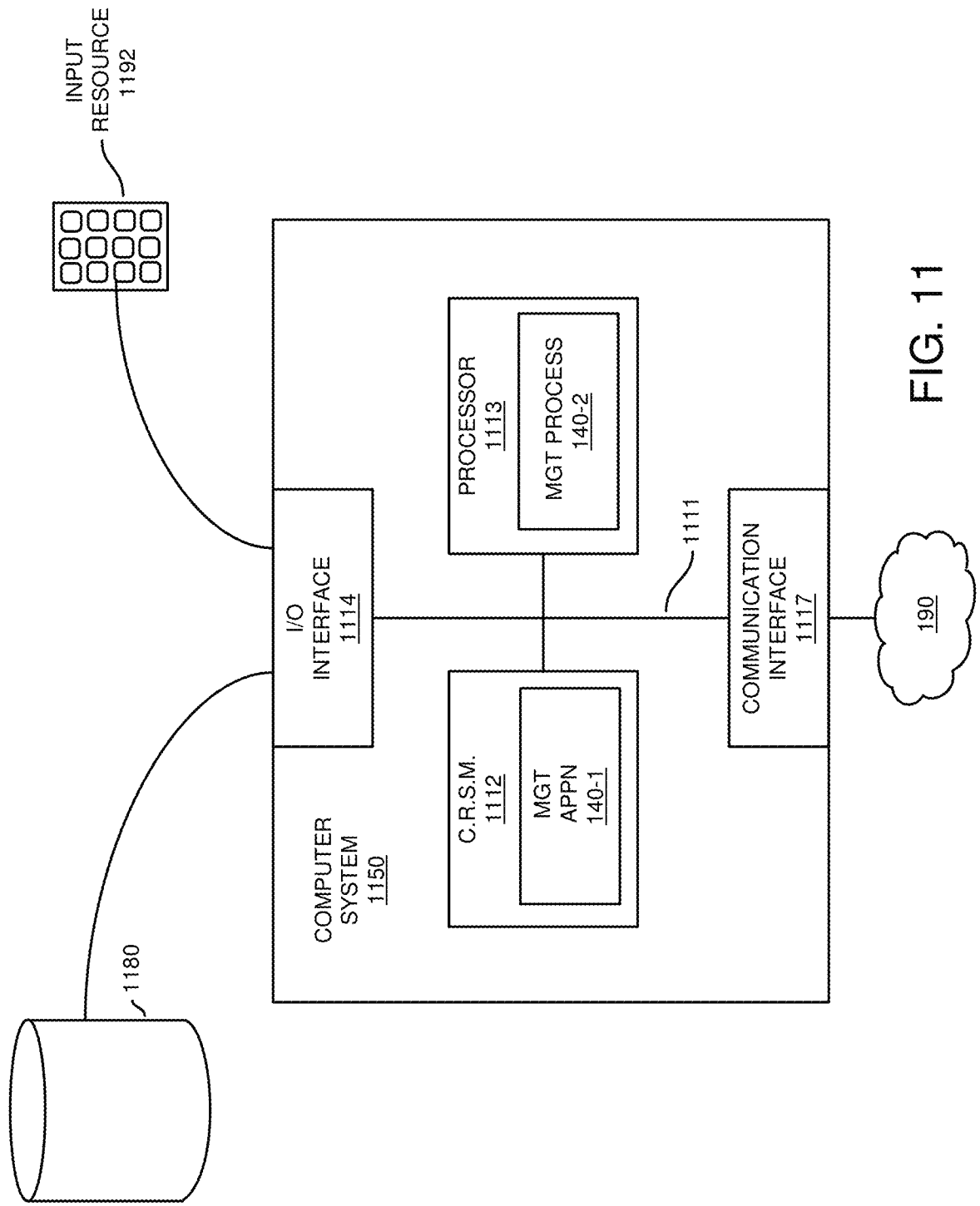
FIG. 11 is a diagram illustrating example computer architecture to execute one or more operations according to embodiments herein.

FIG. 11 is an example block diagram of a computer system for implementing any of the operations as previously discussed according to embodiments herein.

Any of the resources (such as communication management resource, communication management entity 442, spectrum allocation management resource 141, spectrum allocation management resource 142, spectrum monitor 130, spectrum manager 140, wireless station 131-1, wireless station 132-1, etc.) as discussed herein can be configured to include computer processor hardware and/or corresponding executable instructions to carry out the different operations as discussed herein.

As shown, computer system 1150 of the present example includes an interconnect 1111 that couples computer readable storage media 1112 such as a non-transitory type of media (which can be any suitable type of hardware storage medium in which digital information can be stored and retrieved), a processor 1113 (computer processor hardware), I/O interface 1114, and a communications interface 1117.

I/O interface(s) 1114 supports connectivity to repository 1180 and input resource 1192.

Computer readable storage medium 1112 can be any hardware storage device such as memory, optical storage, hard drive, floppy disk, etc. In one embodiment, the computer readable storage medium 1112 stores instructions and/or data.

As shown, computer readable storage media 1112 can be encoded with communication management application 140-1 (e.g., including instructions) to carry out any of the operations as discussed herein.

During operation of one embodiment, processor 1113 accesses computer readable storage media 1112 via the use of interconnect 1111 in order to launch, run, execute, interpret or otherwise perform the instructions in management application 140-1 stored on computer readable storage medium 1112. Execution of the communication management application 140-1 produces communication management process 140-2 to carry out any of the operations and/or processes as discussed herein.

Those skilled in the art will understand that the computer system 1150 can include other processes and/or software and hardware components, such as an operating system that controls allocation and use of hardware resources to execute communication management application 140-1.

In accordance with different embodiments, note that computer system may reside in any of various types of devices, including, but not limited to, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 1150 may reside at any location or can be included in any suitable resource in any network environment to implement functionality as discussed herein.

Functionality supported by the different resources will now be discussed via flowcharts in FIG. 12. Note that the steps in the flowcharts below can be executed in any suitable order.

Figure 12:
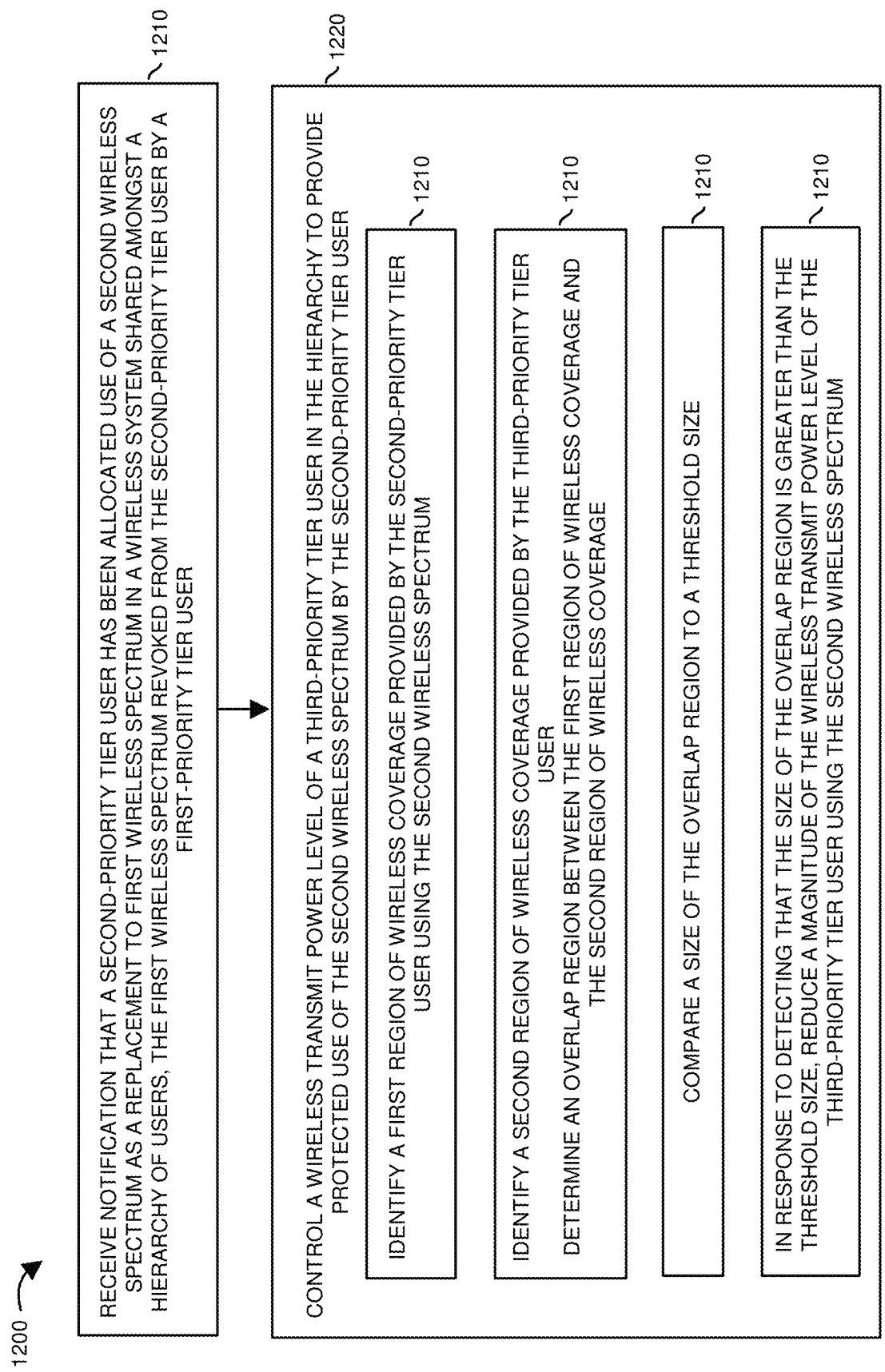
FIG. 12 is an example diagram illustrating a method according to embodiments herein.

FIG. 12 is a flowchart 1200 illustrating an example method according to embodiments. Note that there will be some overlap with respect to concepts as discussed above.

In processing operation 1210, the allocation management resource 142 or other suitable entity (such as communication management entity 442) receives notification that a second-tier priority user (first service provider) has been allocated use of a second wireless spectrum (such as wireless channel #2) as a replacement to first wireless spectrum (such as wireless channel #1) in a wireless system (network environment 100) shared amongst a hierarchy of users (service provider #1, service provider #2 etc.). Assume that the first wireless spectrum (wireless channel #1) is revoked from the second-tier priority user based on use of the channel #1 used by a first-tier priority user (incumbent entity).

In processing operation 1220, the allocation management resource 142 controls a wireless transmit power level of a third-tier priority user (such as service provider #2) in the hierarchy to provide protected use of the second wireless spectrum (wireless channel #2) by the second-tier priority user.

In sub-processing operation 1230, the allocation management resource 142 identifies a first region of wireless coverage provided by the second-tier priority user using the second wireless spectrum (wireless channel #2).

In sub-processing operation 1240, the allocation management resource 142 identifies a second region of wireless coverage provided by the third-tier priority user.

In sub-processing operation 1250, the allocation management resource 142 determines an overlap region between the first region of wireless coverage and the second region of wireless coverage.

In sub-processing operation 1260, the allocation management resource 142 compares a size of the overlap region to a threshold size.

In sub-processing operation 1270, in response to detecting that the size of the overlap region is greater than the threshold size, the allocation management resource 142 or other suitable entity reduces a magnitude of the wireless transmit power level of the third-tier priority user using the second wireless spectrum (wireless channel #2).

Further Embodiments

In accordance with further example embodiments, for each county, a respective allocation management resource (such as SAS) can be configured to map each of the assigned PAL channels (X≤7) to secondary PAL channels not assigned (10–X) in the county in the lower 10 channels of the CBRS band.

The allocation management resource (SAS) or other suitable entity may determine corresponding secondary PAL Protection Areas (PPAs) for the PAL wireless base station (such as so-called CBSDs).

The secondary PAL channel mapping and the corresponding secondary PPAs may be shared among all SASs during SAS exchange of information (CPAS).

When a DPA (Dynamic Protection Area) is activated due to occurrence of incumbent activity, the allocation management resource (SAS) reassigns the affected PAL wireless base stations (such as CBSDs) to the secondary PAL channels according to the backup mapping. All allocation management resources in the wireless system may then protect the PAL CBSDs from GAA and other PAL CBSDs by using an iterative allocation process (IAP). The deficiency associated with this approach is that a DPA may impact some, but not all CBSDs in a PPA. Moreover, multiple DPAs may be activated at the same time which may impact different CBSDs within a PPA. In this case, a PPA may have to split into multiple smaller PPAs, with some of them staying on the primary channel assigned to them, while others moving to a secondary channel.

There are several problems that make the above a difficult process such as i) SAS computation complexity in determining split PPA contours, ii) SAS computation complexity in determining protection of split PPAs from GAA and other PAL CBSDs based on aggregate interference, iii) SAS requirements for exchanging split PPA contours data every time a DPA activates and deactivates, and iv) Frequent changes in PAL and GAA CBSD carrier frequencies.

In one embodiment, each managing allocation management resource (SAS) provides a list of its PAL CBSDs impacted by DPA along with their new channel assignment to other SASs at the time or shortly after detection of DPA activation (caused by detecting incumbent use of with PAL wireless channel.

As previously discussed, the backup channel assignment may be based on secondary PAL channel mapping.

A new EIRP (such as Effective Isotropic Radiated Power, which is a calculation used to estimate the radiated output power of an isotropic antenna (a theoretical half wave dipole antenna that radiates perfectly in all directions) is based on the existing CBSD grant on the old channel, except it is reduced when the new channel assignment impacts a Tier-1 user or a Tier-2 (PAL) user in an adjoining county The allocation management resource (SAS) computes (or retrieves from memory) the coverage zone for each PAL CBSD impacted by DPA. In one embodiment, the coverage zone or region of wireless coverage is based on −96 dBm coverage contour as defined by FCC 47 CFR Part 96 rules. The coverage contour determined for the old channel assignment can be reused.

The allocation management resource also computes the coverage zone for its GAA CBSDs located in the coverage zones and surrounding areas of the PAL CBSDs.

Trigger event allocation management resource determines the coverage overlap for each of its GAA CBSDs with the impacted PAL CBSDs.

The coverage overlap is compared to a threshold. If the overlap is less than the threshold, then the GAA CBSD spectrum grant is unaffected. Otherwise, the grant is suspended or the EIRP is reduced to make the overlap smaller than the threshold When DPA deactivates, the managing allocation management resource provides an indication to other allocation management resources. The original PAL protection areas are restored and protected. The impacted GAA CBSD grants may be restored (unsuspended or returned back to original EIRP).

The main benefit of this embodiment is that allocation management resource does not have to run the iterative allocation process (IAP) to determine PAL protection. Also, the coverage contours for PAL CBSDs don't have to be recalculated.

In one embodiment, the allocation management resources exchange PAL info and protect PAL CBSDs on an individual basis. Such an embodiment is useful when a PPA has to be broken into many small PPAs because some, but not all, CBSDs in a PPA are reassigned to new channel(s) or when some CBSDs are reassigned to one channel or channels and other CBSDs are reassigned to another channel or channels.

Further embodiments herein allow an allocation management resource to exchange PAL info and protect PAL CBSDs on a group/PPA basis. This is useful when a PPA does not need to be broken as all CBSDs in a PPA are impacted and moved to the same secondary channel(s) or when a PPA is broken into a few PPAs only.

In this embodiment, SAS determines the new smaller PPA contours for its CBSDs that need to be reassigned. It also determines the new PPA contour for its remaining CBSDs that are not reassigned. The new PPA contours are determined by taking a union of the coverage contours of its CBSDs. The allocation management resource shares this information with other allocation management resources along with the new channel assignments and EIRP grants.

In further example embodiments, the allocation management resource can be configured to determines the coverage overlap for each of its GAA CBSDs with each of the new PPA contours. If desired, the coverage overlap area can be normalized by the geometric mean of the coverage areas of the two contours (such as region of wireless coverage associated with the third-tier priority entity and region of wireless coverage proved by a respective union of all regions of wireless coverage of the second-tier priority entity.

In a similar manner as previously discussed, the normalized coverage overlap is compared to a threshold. If the overlap is less than the threshold, then the GAA CBSD grant is unaffected. Otherwise, the grant is suspended or the EIRP is reduced to make the overlap smaller than the threshold Note again that techniques herein are well suited to facilitate protection of licensed users (wireless network service providers) in a hierarchical wireless spectrum allocation system. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

The invention claimed is:

1. In a wireless system shared amongst a hierarchy of entities including a first-tier priority entity, a second-tier priority entity, and a third-tier priority entity, a method comprising:
    at the third-tier priority entity:
        initially receiving allocation of a second wireless channel to wirelessly communicate with multiple communication devices;
        receiving notification to adjust a power level of wirelessly transmitting over the second wireless channel from the third-tier priority entity in response to a detected condition in which the second-tier priority entity has been allocated use of the second wireless channel as a replacement to a first wireless channel; and
        in response to receiving the notification, adjusting the power level of wirelessly transmitting communications from the third-tier priority entity over the second wireless channel to the multiple communication devices.

2. The method as in claim 1, wherein the second-tier priority entity is allocated use of the second wireless channel as the replacement to the first wireless channel in response to detected use of the first wireless channel by the first-tier priority entity.

3. The method as in claim 1, wherein adjusting the power level of wirelessly transmitting communications from the third-tier priority entity includes:
    reducing the power level of wirelessly transmitting the communications from the third-tier priority entity over the second wireless channel.

4. The method as in claim 3, wherein the reduced power level of wirelessly transmitting the communications from the third-tier priority entity is operative to reduce interference caused by the third-tier priority entity to the second-tier priority entity using the second wireless channel.

5. The method as in claim 1, wherein the second-tier priority entity is granted use of the second wireless channel as the replacement to the first wireless channel based on a license assigned to the second-tier priority entity; and
    wherein the second-tier priority entity is afforded protected use of the second wireless channel from the third-tier priority entity based on the license.

6. The method as in claim 5, wherein the third-tier priority entity is a non-licensed entity in the hierarchy.

7. The method as in claim 1, wherein the first-tier priority entity is an incumbent entity in the wireless system, the wireless system operative to implement use of CBRS (Citizen Band Radio Service) wireless channels including the first wireless channel and the second wireless channel;
    wherein the second-tier priority entity is a PAL (Priority Access Licensed) entity in the wireless system; and
    wherein the third-tier priority entity is a GAA (General Authorized Access) entity in the wireless system.

8. The method as in claim 1, wherein the first-tier priority entity in the hierarchy has higher priority rights to use the first wireless channel than the second-tier priority entity; and
    wherein the second-tier priority entity in the hierarchy has higher priority rights to use the second wireless channel than the third-tier priority entity.

9. The method as in claim 1, wherein the second-tier priority entity and the third-tier priority entity are simultaneously allocated use of the second wireless channel during the detected condition in response to the first-tier priority entity using the first wireless channel.

10. The method as in claim 1, wherein the second-tier priority entity is pre-assigned use of the second wireless channel as a backup wireless channel prior to the detected condition.

11. The method as in claim 1, wherein the first-tier priority entity in the hierarchy has higher priority rights to the first wireless channel than the second-tier priority entity and the third-tier priority entity.

12. The method as in claim 11, wherein the second-tier priority entity in the hierarchy has higher priority rights to the second wireless channel than the third-tier priority entity.

13. The method as in claim 1, wherein the second-tier priority entity is a first wireless base station allocated use of the second wireless channel as the replacement to the first wireless channel; and
wherein the third-tier priority entity is a second wireless base station allocated use of the second wireless channel prior to the first wireless base station being allocated use of the second wireless channel as the replacement to the first wireless channel.

14. The method as in claim 1, wherein the first wireless channel is allocated to the second-tier priority entity as wireless bandwidth licensed by the second-tier priority entity;
wherein the second wireless channel is allocated to the second-tier priority entity as a backup licensed wireless channel; and
wherein the second wireless channel is allocated to the third-tier priority entity as a non-licensed wireless channel.

15. The method as in claim 1, wherein the first wireless channel is initially allocated to the second-tier priority entity as a licensed wireless channel to support wireless communications between the second-tier priority entity and a first wireless station prior to the replacement.

16. The method as in claim 1, wherein, prior to the replacement, the first wireless channel is allocated to the second-tier priority entity to support wireless connectivity between the second-tier priority entity and a first wireless station; and
wherein the second wireless channel is allocated to the second-tier priority entity as the replacement to support continued wireless communications between the second-tier priority entity and the first wireless station.

17. The method as in claim 1, wherein the first wireless channel is a first wireless channel in a tiered channel hierarchy; and
wherein the second wireless channel is a second wireless channel in the tiered channel hierarchy.

18. The method as in claim 17, wherein the first wireless channel is assigned as a licensed wireless channel to the second-tier priority entity; and
wherein the second wireless channel is assigned as a non-licensed wireless channel to the third-tier priority entity prior to the replacement.

19. The method as in claim 18, wherein the second wireless channel is pre-designated as a backup wireless channel as the replacement to the first wireless channel prior to receiving the notification.

20. The method as in claim 1, wherein adjusting the power level of wirelessly transmitting the communications from the third-tier priority entity includes: reducing a power level of wirelessly transmitting the communications over the second wireless channel from a wireless station operated by the third-tier priority entity.

21. The method as in claim 1 further comprising:
determining a size of overlap region of: i) a first region of wireless coverage associated with the second-tier priority entity using the second wireless channel, and ii) a second region of wireless coverage associated with the third-tier priority entity using the second wireless channel.

22. The method as in claim 21, wherein adjusting the power level of wirelessly transmitting communications from the third-tier priority entity over the second wireless channel to the multiple communication devices includes:
comparing a magnitude of the size of the overlap region to a threshold level; and
reducing the power level of wirelessly transmitting the communications from the third-tier priority entity over the second wireless channel until the magnitude of the size of the overlap region is less than the threshold level.

23. An apparatus comprising:
communication management hardware associated with a third-tier priority entity operated in a wireless system shared amongst a hierarchy of entities including a first-tier priority entity, a second-tier priority entity, and the third-tier priority entity, the communication management hardware operative to:
initially receive allocation of a second wireless channel to wirelessly communicate with multiple communication devices; and
receive notification to adjust a power level of wirelessly transmitting over the second wireless channel from the third-tier priority entity in response to a condition in which the second-tier priority entity has been allocated use of the second wireless channel as a replacement to a first wireless channel.

24. The system as in claim 23, wherein the second-tier priority entity is allocated use of the second wireless channel entity as the replacement to the first wireless channel in response to detected use of the first wireless channel by the first-tier priority entity.

25. The system method as in claim 23, wherein the communication management hardware is further operative to:
in response to receiving the notification, reduce the power level of the third-tier priority entity wirelessly transmitting communications over the second wireless channel.

26. The system as in claim 25, wherein the reduced power level of wirelessly transmitting the communications from the third-tier priority entity is operative to reduce interference caused by the third-tier priority entity to the second-tier priority entity using the second wireless channel.

27. The system as in claim 23, wherein the second-tier priority entity is granted use of the second wireless channel based on a license assigned to the second-tier priority entity; and
wherein the second-tier priority entity is afforded protected use of the second wireless channel from the third-tier priority entity based on the license.

28. The system as in claim 23, wherein the second-tier priority entity is pre-assigned use of the second wireless channel as a backup wireless channel for a condition in which the first-tier priority entity is detected as using the first wireless channel, the second-tier priority entity being pre-assigned use of the second wireless channel prior to receiving the notification.

29. In a wireless system shared amongst a hierarchy of entities including a first-tier priority entity, a second-tier priority entity, and a third-tier priority entity, a method comprising:
producing primary spectrum allocation information associated with use of multiple wireless channels in the wireless system, the primary spectrum allocation information indicating: i) assignment of a first wireless channel as a licensed wireless channel assigned for use by the second-tier priority entity during a first mode, ii) assignment of a second wireless channel as a non-licensed wireless channel assigned for use by the third priority entity during the first mode;
producing secondary spectrum allocation information associated with the multiple wireless channels, the secondary spectrum allocation information indicating assignment of the second wireless channel as a licensed wireless channel assigned for use by the second-tier priority entity during a second mode in which the first wireless channel is used by the first-tier priority entity;

wherein the secondary spectrum allocation information is a backup allocation with respect to the primary spectrum allocation information;

wherein the primary spectrum allocation information is configured to support the first mode including, prior to detection of the first wireless channel being used by the first-tier priority entity: i) notification to the second-tier priority entity to use the first wireless channel, and ii) notification to the third-tier priority entity to use the second wireless channel; and wherein the secondary spectrum allocation information is configured to support the second mode including, subsequent to detection that the first-tier priority entity is using the first wireless channel: i) notification to the second-tier priority entity to use the second wireless channel as a replacement with respect to the first wireless channel, and ii) notification to the third-tier priority entity to adjust a power level of the third-tier priority entity wirelessly transmitting over the second wireless channel.

* * * * *

UNITED STATES PATENT AND TRADEMARK OFFICE
CERTIFICATE OF CORRECTION

| | | |
|---|---|---|
| PATENT NO. | : 12,245,048 B2 | Page 1 of 1 |
| APPLICATION NO. | : 18/209114 | |
| DATED | : March 4, 2025 | |
| INVENTOR(S) | : Abdulrauf Hafeez and Maulik V. Vaidya | |

It is certified that error appears in the above-identified patent and that said Letters Patent is hereby corrected as shown below:

In the Claims

Claim 29, Line 20, replace ":" with --;--

Signed and Sealed this
Twenty-ninth Day of April, 2025

Coke Morgan Stewart
*Acting Director of the United States Patent and Trademark Office*